(12) United States Patent
D'Souza et al.

(10) Patent No.: US 8,799,206 B2
(45) Date of Patent: *Aug. 5, 2014

(54) DYNAMIC BULK-TO-BRICK TRANSFORMATION OF DATA

(75) Inventors: Roy P. D'Souza, Santa Clara, CA (US); Thirumalai Muppur Ravi, Portola Valley, CA (US)

(73) Assignee: Mimosa Systems, Inc., San Francisco, CA (US)

( * ) Notice: Subject to any disclaimer, the term of this patent is extended or adjusted under 35 U.S.C. 154(b) by 999 days.

This patent is subject to a terminal disclaimer.

(21) Appl. No.: 11/541,858

(22) Filed: Oct. 2, 2006

(65) Prior Publication Data

US 2007/0150499 A1    Jun. 28, 2007

Related U.S. Application Data

(63) Continuation-in-part of application No. 11/500,809, filed on Aug. 7, 2006, now Pat. No. 8,161,318, which is a continuation-in-part of application No. 11/211,056, filed on Aug. 23, 2005, now Pat. No. 7,778,976.

(60) Provisional application No. 60/650,556, filed on Feb. 7, 2005.

(51) Int. Cl.
    *G06F 17/30* (2006.01)
(52) U.S. Cl.
    USPC .......................................................... 707/602
(58) Field of Classification Search
    USPC ........................ 707/611, 613, 615, 618, 655
    See application file for complete search history.

(56) References Cited

U.S. PATENT DOCUMENTS

| 4,759,636 A | 7/1988 | Ahern et al. |
| 4,914,586 A | 4/1990 | Swinehart et al. |

(Continued)

FOREIGN PATENT DOCUMENTS

| WO | 2006086146 | 8/2006 |
| WO | 2007024478 | 3/2007 |

(Continued)

OTHER PUBLICATIONS

Form PCT/ISA/220, PCT/US06/02405, "PCT Notification of Transmittal of the International Search Report and the Written Opinion of the International Searching Authority, or the Declaration," 1 pg.

(Continued)

*Primary Examiner* — Ajay Bhatia
*Assistant Examiner* — Fatima Mina

(57) ABSTRACT

Multi-dimensional surrogation systems and methods are provided that generate at least one up-to-date data surrogate using information of data and numerous data changes received from at least one data source, including a production system. Embodiments described further perform bulk-to-brick transformation of the up-to-date data surrogate. Brick-level data, or item data, is further indexed and stored in an application-aware manner. The stored item data is easily accessible by many data management applications for integrated item search and recovery functions, audit functions, monitoring and supervision functions, legal discovery functions, compliance functions, archival functions, backup functions, disaster recovery functions, and more. Bulk-to-brick transformation and access of the stored item data occur off of the production system, thus contributing no performance degradation to the production system.

53 Claims, 16 Drawing Sheets

(56) References Cited

U.S. PATENT DOCUMENTS

| | | | |
|---|---|---|---|
| 5,081,603 A | 1/1992 | Mikos | |
| 5,159,512 A | 10/1992 | Evans et al. | |
| 5,202,971 A | 4/1993 | Henson et al. | |
| 5,239,492 A | 8/1993 | Hartwig et al. | |
| 5,274,815 A | 12/1993 | Trissel et al. | |
| 5,276,883 A | 1/1994 | Halliwell | |
| 5,287,501 A | 2/1994 | Lomet | |
| 5,337,311 A | 8/1994 | Herzberg et al. | |
| 5,418,940 A | 5/1995 | Mohan | |
| 5,442,562 A | 8/1995 | Hopkins et al. | |
| 5,448,708 A | 9/1995 | Ward | |
| 5,481,708 A | 1/1996 | Kukol | |
| 5,487,145 A | 1/1996 | Marsh et al. | |
| 5,517,562 A | 5/1996 | McConnell | |
| 5,537,526 A | 7/1996 | Anderson et al. | |
| 5,544,297 A | 8/1996 | Milne et al. | |
| 5,574,897 A | 11/1996 | Hermsmeier et al. | |
| 5,604,892 A | 2/1997 | Nuttall et al. | |
| 5,625,820 A | 4/1997 | Hermsmeier et al. | |
| 5,644,768 A | 7/1997 | Periwal et al. | |
| 5,649,135 A | 7/1997 | Pechanek et al. | |
| 5,675,555 A | 10/1997 | Evans et al. | |
| 5,689,080 A | 11/1997 | Gulick | |
| 5,689,698 A | 11/1997 | Jones et al. | |
| 5,694,563 A | 12/1997 | Belfiore et al. | |
| 5,706,510 A | 1/1998 | Burgoon | |
| 5,721,916 A | 2/1998 | Pardikar | |
| 5,754,841 A | 5/1998 | Carino, Jr. | |
| 5,758,351 A | 5/1998 | Gibson et al. | |
| 5,787,254 A | 7/1998 | Maddalozzo et al. | |
| 5,815,665 A | 9/1998 | Teper et al. | |
| 5,870,474 A | 2/1999 | Wasilewski et al. | |
| 5,870,763 A | 2/1999 | Lomet | |
| 5,916,303 A | 6/1999 | Scott | |
| 5,930,806 A * | 7/1999 | Taira et al. | 1/1 |
| 5,933,838 A | 8/1999 | Lomet | |
| 5,946,698 A | 8/1999 | Lomet | |
| 5,950,212 A | 9/1999 | Anderson et al. | |
| 5,966,706 A | 10/1999 | Biliris et al. | |
| 5,974,563 A | 10/1999 | Beeler, Jr. | |
| 6,006,342 A | 12/1999 | Beardsley et al. | |
| 6,014,674 A | 1/2000 | McCargar | |
| 6,067,550 A | 5/2000 | Lomet | |
| 6,094,437 A | 7/2000 | Loehndorf et al. | |
| 6,094,654 A | 7/2000 | Van Huben et al. | |
| 6,098,078 A | 8/2000 | Gehani et al. | |
| 6,131,095 A | 10/2000 | Low et al. | |
| 6,148,410 A | 11/2000 | Baskey et al. | |
| 6,151,607 A | 11/2000 | Lomet | |
| 6,182,086 B1 | 1/2001 | Lomet et al. | |
| 6,185,699 B1 | 2/2001 | Haderle et al. | |
| 6,226,651 B1 | 5/2001 | Masuda et al. | |
| 6,240,414 B1 | 5/2001 | Beizer et al. | |
| 6,243,443 B1 | 6/2001 | Low et al. | |
| 6,246,758 B1 | 6/2001 | Low et al. | |
| 6,249,879 B1 | 6/2001 | Walker et al. | |
| 6,252,869 B1 | 6/2001 | Silverman | |
| 6,253,230 B1 | 6/2001 | Couland et al. | |
| 6,256,773 B1 | 7/2001 | Bowman-Amuah | |
| 6,260,129 B1 | 7/2001 | Crockett et al. | |
| 6,282,281 B1 | 8/2001 | Low | |
| 6,338,146 B1 | 1/2002 | Johnson et al. | |
| 6,347,182 B1 | 2/2002 | Okada | |
| 6,374,292 B1 | 4/2002 | Srivastava et al. | |
| 6,385,706 B1 | 5/2002 | Ofek et al. | |
| 6,397,308 B1 | 5/2002 | Ofek et al. | |
| 6,424,714 B1 | 7/2002 | Wasilewski et al. | |
| 6,430,276 B1 | 8/2002 | Bouvier et al. | |
| 6,434,568 B1 | 8/2002 | Bowman-Amuah | |
| 6,466,570 B1 | 10/2002 | Low et al. | |
| 6,477,580 B1 | 11/2002 | Bowman-Amuah | |
| 6,487,561 B1 | 11/2002 | Ofek et al. | |
| 6,490,594 B1 | 12/2002 | Lomet | |
| 6,516,337 B1 | 2/2003 | Tripp et al. | |
| 6,523,027 B1 | 2/2003 | Underwood | |
| 6,556,672 B1 | 4/2003 | Holland et al. | |
| 6,557,036 B1 | 4/2003 | Kavacheri et al. | |
| 6,564,215 B1 | 5/2003 | Hsiao et al. | |
| 6,578,041 B1 | 6/2003 | Lomet | |
| 6,587,933 B2 | 7/2003 | Crockett et al. | |
| 6,615,225 B1 * | 9/2003 | Cannon et al. | 1/1 |
| 6,668,253 B1 | 12/2003 | Thompson et al. | |
| 6,675,205 B2 | 1/2004 | Meadway et al. | |
| 6,694,447 B1 | 2/2004 | Leach et al. | |
| 6,718,361 B1 | 4/2004 | Basani et al. | |
| 6,720,915 B2 | 4/2004 | Sheynblat | |
| 6,748,447 B1 | 6/2004 | Basani et al. | |
| 6,766,326 B1 | 7/2004 | Cena | |
| 6,798,771 B1 | 9/2004 | Low et al. | |
| 6,831,915 B1 | 12/2004 | Beyschlag et al. | |
| 6,856,282 B2 | 2/2005 | Mauro et al. | |
| 6,920,537 B2 | 7/2005 | Ofek et al. | |
| 6,947,982 B1 | 9/2005 | McGann et al. | |
| 6,961,417 B2 | 11/2005 | Koch | |
| 6,978,279 B1 | 12/2005 | Lomet et al. | |
| 6,993,587 B1 | 1/2006 | Basani et al. | |
| 7,012,916 B2 | 3/2006 | Low et al. | |
| 7,053,826 B1 | 5/2006 | McBurney et al. | |
| 7,054,845 B2 * | 5/2006 | Oshima et al. | 705/78 |
| 7,054,875 B2 * | 5/2006 | Keith, Jr. | 1/1 |
| 7,058,683 B1 | 6/2006 | Belissent et al. | |
| 7,100,195 B1 | 8/2006 | Underwood | |
| 7,103,740 B1 | 9/2006 | Colgrove et al. | |
| 7,107,395 B1 | 9/2006 | Ofek et al. | |
| 7,117,386 B2 | 10/2006 | LeCrone et al. | |
| 7,146,476 B2 | 12/2006 | Sandorfi et al. | |
| 7,177,886 B2 | 2/2007 | Pruet, III | |
| 7,197,520 B1 | 3/2007 | Matthews et al. | |
| 7,206,911 B2 | 4/2007 | Wolfgang et al. | |
| 7,212,726 B2 | 5/2007 | Zetts | |
| 7,257,689 B1 * | 8/2007 | Baird | 711/162 |
| 7,263,537 B1 | 8/2007 | Lin et al. | |
| 7,266,655 B1 | 9/2007 | Escabi et al. | |
| 7,277,941 B2 | 10/2007 | Ignatius et al. | |
| 7,315,923 B2 | 1/2008 | Retnamma et al. | |
| 7,346,682 B2 | 3/2008 | Basani et al. | |
| 7,392,421 B1 | 6/2008 | Bloomstein et al. | |
| 7,426,652 B2 | 9/2008 | Liccione et al. | |
| 7,430,647 B2 | 9/2008 | Sandorfi et al. | |
| 7,451,221 B2 | 11/2008 | Basani et al. | |
| 7,461,100 B2 | 12/2008 | Spear et al. | |
| 7,469,294 B1 | 12/2008 | Luo et al. | |
| 7,475,204 B2 | 1/2009 | Buah et al. | |
| 7,512,835 B2 | 3/2009 | Bartfai et al. | |
| 7,523,348 B2 | 4/2009 | Anand et al. | |
| 7,568,124 B2 | 7/2009 | Ali et al. | |
| 7,599,682 B2 | 10/2009 | Takeda et al. | |
| 7,657,780 B2 | 2/2010 | D'Souza | |
| 7,721,117 B2 | 5/2010 | Sherer et al. | |
| 7,725,438 B1 | 5/2010 | Shah et al. | |
| 7,744,540 B2 | 6/2010 | Rao et al. | |
| 7,747,741 B2 | 6/2010 | Basani et al. | |
| 7,756,833 B2 | 7/2010 | Van Ingen et al. | |
| 7,778,976 B2 | 8/2010 | D'Souza | |
| 7,836,162 B2 | 11/2010 | Miyata | |
| 7,870,416 B2 | 1/2011 | D'Souza | |
| 7,899,915 B2 | 3/2011 | Reisman | |
| 7,917,475 B2 | 3/2011 | D'Souza | |
| 7,987,491 B2 | 7/2011 | Reisman | |
| 8,032,592 B2 | 10/2011 | Campise et al. | |
| 8,161,318 B2 | 4/2012 | D'Souza | |
| 8,271,436 B2 | 9/2012 | D'Souza | |
| 8,275,749 B2 | 9/2012 | D'Souza | |
| 8,276,016 B2 | 9/2012 | D'Souza | |
| 8,442,950 B2 | 5/2013 | D'Souza | |
| 8,543,542 B2 | 9/2013 | D'Souza | |
| 2001/0030941 A1 | 10/2001 | Musikka et al. | |
| 2002/0010700 A1 | 1/2002 | Wotring | |
| 2002/0023097 A1 | 2/2002 | Ripley | |
| 2002/0029207 A1 | 3/2002 | Bakalash et al. | |
| 2002/0065932 A1 | 5/2002 | Kobayashi | |
| 2002/0107877 A1 | 8/2002 | Whiting | |
| 2002/0129096 A1 | 9/2002 | Mansour et al. | |
| 2002/0143943 A1 * | 10/2002 | Lee et al. | 709/225 |

(56) References Cited

U.S. PATENT DOCUMENTS

| | | | |
|---|---|---|---|
| 2002/0163910 A1 | 11/2002 | Wisner et al. | |
| 2003/0005350 A1 | 1/2003 | Koning et al. | |
| 2003/0009295 A1 | 1/2003 | Markowitz et al. | |
| 2003/0058277 A1* | 3/2003 | Bowman-Amuah | 345/765 |
| 2003/0061456 A1 | 3/2003 | Ofek et al. | |
| 2003/0120458 A1 | 6/2003 | Rao et al. | |
| 2003/0131116 A1* | 7/2003 | Jain et al. | 709/230 |
| 2003/0135499 A1 | 7/2003 | Schirmer et al. | |
| 2003/0159083 A1 | 8/2003 | Fukuhara et al. | |
| 2003/0200272 A1 | 10/2003 | Campise et al. | |
| 2003/0229900 A1 | 12/2003 | Reisman | |
| 2003/0233518 A1 | 12/2003 | Yamagami et al. | |
| 2004/0025076 A1 | 2/2004 | Cabrera et al. | |
| 2004/0031058 A1 | 2/2004 | Reisman | |
| 2004/0034808 A1 | 2/2004 | Day et al. | |
| 2004/0098547 A1 | 5/2004 | Ofek et al. | |
| 2004/0158766 A1 | 8/2004 | Liccione et al. | |
| 2004/0215656 A1 | 10/2004 | Dill et al. | |
| 2004/0215709 A1 | 10/2004 | Basani et al. | |
| 2004/0225834 A1 | 11/2004 | Lu et al. | |
| 2004/0268175 A1 | 12/2004 | Koch et al. | |
| 2005/0010550 A1 | 1/2005 | Potter et al. | |
| 2005/0015466 A1* | 1/2005 | Tripp | 709/219 |
| 2005/0044197 A1 | 2/2005 | Lai | |
| 2005/0071392 A1 | 3/2005 | Sandorfi et al. | |
| 2005/0108486 A1 | 5/2005 | Sandorfi | |
| 2005/0138002 A1* | 6/2005 | Giacobbe et al. | 707/3 |
| 2005/0193235 A1 | 9/2005 | Sandorfi et al. | |
| 2005/0198359 A1 | 9/2005 | Basani et al. | |
| 2005/0228937 A1 | 10/2005 | Karr et al. | |
| 2005/0246245 A1* | 11/2005 | Satchell et al. | 705/26 |
| 2005/0246345 A1 | 11/2005 | Lent et al. | |
| 2005/0246510 A1 | 11/2005 | Retnamma et al. | |
| 2005/0257062 A1 | 11/2005 | Ignatius et al. | |
| 2005/0268145 A1 | 12/2005 | Hufferd et al. | |
| 2005/0278391 A1 | 12/2005 | Spear et al. | |
| 2006/0053147 A1 | 3/2006 | Wahlert | |
| 2006/0053259 A1* | 3/2006 | Berkowitz et al. | 711/162 |
| 2006/0064444 A1 | 3/2006 | van Ingen et al. | |
| 2006/0112244 A1 | 5/2006 | Buah et al. | |
| 2006/0179061 A1 | 8/2006 | D'Souza et al. | |
| 2006/0218210 A1 | 9/2006 | Sarma et al. | |
| 2006/0223510 A1 | 10/2006 | Takeda et al. | |
| 2006/0248212 A1 | 11/2006 | Sherer et al. | |
| 2006/0248213 A1 | 11/2006 | Sherer et al. | |
| 2007/0124341 A1 | 5/2007 | Lango et al. | |
| 2007/0143366 A1 | 6/2007 | D'Souza et al. | |
| 2007/0143373 A1 | 6/2007 | D'Souza et al. | |
| 2007/0143374 A1 | 6/2007 | D'Souza et al. | |
| 2007/0150526 A1 | 6/2007 | D'Souza et al. | |
| 2007/0156792 A1 | 7/2007 | D'Souza et al. | |
| 2007/0156793 A1 | 7/2007 | D'Souza et al. | |
| 2007/0168500 A1 | 7/2007 | D'Souza et al. | |
| 2007/0174691 A1 | 7/2007 | D'Souza et al. | |
| 2007/0276842 A1 | 11/2007 | Miyata | |
| 2008/0091894 A1 | 4/2008 | Retnamma et al. | |
| 2009/0028084 A1 | 1/2009 | Ping | |
| 2009/0043980 A1 | 2/2009 | McBride et al. | |
| 2009/0113253 A1 | 4/2009 | Wang et al. | |
| 2009/0150475 A1 | 6/2009 | Cebis et al. | |
| 2010/0007713 A1 | 1/2010 | Yamamoto | |
| 2010/0114334 A1 | 5/2010 | Krumsiek | |
| 2010/0138395 A1 | 6/2010 | D'Souza et al. | |
| 2011/0225123 A1 | 9/2011 | D'Souza et al. | |

FOREIGN PATENT DOCUMENTS

| | | |
|---|---|---|
| WO | 2007024479 | 3/2007 |
| WO | 2008020859 | 2/2008 |
| WO | 2008020860 | 2/2008 |

OTHER PUBLICATIONS

Form PCT/ISA/210, PCT/US06/02405, "PCT International Search Report," 2 pgs.
Form PCT/ISA/237, PCT/US06/02405, "PCT Written Opinion of the International Searching Authority," 4 pgs.
Form PCT/ISA/220, PCT/US06/30928, "PCT Notification of Transmittal of the International Search Report and the Written Opinion of the International Searching Authority, or the Declaration," 1 pg.
Form PCT/ISA/210, PCT/US06/30928, "PCT International Search Report," 3 pgs.
Form PCT/ISA/237, PCT/US06/30928, "PCT Written Opinion of the International Searching Authority," 6 pgs.
Form PCT/ISA/220, PCT/US06/30927, "PCT Notification of Transmittal of the International Search Report and the Written Opinion of the International Searching Authority, or the Declaration," 1 pg.
Form PCT/ISA/210, PCT/US06/30927, "PCT International Search Report," 2 pgs.
Form PCT/ISA/237, PCT/US06/30927, "PCT Written Opinion of the International Searching Authority," 7 pgs.
Form PCT/ISA/220, PCT/US06/38260,"PCT Notification of Transmittal of the International Search Report and the Written Opinion of the International Searching Authority, or the Declaration," 1 pg.
Form PCT/ISA/210, PCT/US06/38260, "PCT International Search Report," 2 pgs.
Form PCT/ISA/237, PCT/US06/38260, "PCT Written Opinion of the International Searching Authority," 3 pgs.
Form PCT/ISA/220, PCT/US06/38291, "PCT Notification of Transmittal of the International Search Report and the Written Opinion of the International Searching Authority, or the Declaration," 1 pg.
Form PCT/ISA/210, PCT/US06/38291, "PCT International Search Report," 2 pgs.
Form PCT/ISA/237, PCT/US06/38291, "PCT Written Opinion of the International Searching Authority," 3 pgs.
Form/IB/373, PCT/US06/038260, "International Report on Patentability," 1 pg.
Form/IB/373, PCT/US06/038291, "International Report on Patentability," 1 pg.
Form EPO/1507S, PCT/US06/002405, "EPO Communication" 1 pg.
Form EPO/1503, PCT/US06/002405, "Supplementary European Search Report", 3 pgs.
Form EPO/P0459, PCT/US06/002405, "Annex to the European Search Report", 1 pg.
Form EPA/2906, PCT/US06/002405, "Examination", 5 pgs.
Adams K. Geographically Distributed System for Catastrophic Recovery. LISA 2002. Nov. 3-8, 2002, pp. 47-64.
Rosenblum, M and Ousterhout, J.K, 1992. The design and implementation of a log-structured file system. ACM Trans. Comput. Syst. 10,1 (Feb. 1992), 26-52 DOI=http://doi.acm.org/10.1145/146941.146943.
Gait, J,1991. Stability, Availability, and Response in Network File Service. IEEE Trans. Softw. Eng. 17, 2(Feb. 1991),133-140 DOI= http://dx.doi.org/10.1109/32.67594.
Spurzem B: "Mimosa NearPoint for Microsoft Exchange Server" Internet [Online] Jan. 2005, pp. 1-18, XP002519249 Retrieved from the Internet: URL:http://www.Flexnet.com/Exchange_Email_Archiving_and_Compliance/
NearPoint%20Architecture%20for%20Exchange.pdf> [retrieved on Mar. 11, 2009]* p. 5, line 18-line 20 * * p. 6, line 2-line 5 * * p. 6, line 16-line 26 * * p. 7, line 22-line 33 * * p. 8, line 4-line 15 * * p. 8, line 25-line 28 * * figure 2 *.
Spurzem B: "Advantages of Mimosa NearPoint for Email Archival" Internet, [Online] Jan. 2005, pp. 1-14, XP002519383 Retrieved from the Internet: URL:http://www.Flexnet.com/Exchange_Email_Archiving_and_Compliance/NearPoint%20E-mail%20Archive%20for%20Exchange.pdf> [retrieved on Mar. 11, 2009] * p. 3, line 1-17 * * p. 9, line 1-p. 11, line 8 * * figure 1 *.
Mimosa Systems: Mimosa Architecture Internet, [Online] Oct. 29, 2004, pp. 1-5, XP002519438 Retrieved from the Internet: URL:http://web.archive.org/web/20041029172122/www.mimosasystems.com/arch.htm> [retrieved on Mar. 11, 2009] * p. 4, line 5-line 24 *.
Kupsys, A.; Ekwall R., "Architectural Issues of JMS Compliant Group Communication," Network Computing and Applications, Fourth IEEE International Symposium on Volume, Issue, Jul. 27-29, 2005 pp. 139-148.

(56) References Cited

OTHER PUBLICATIONS

Narasimhan P. et al. "Eternal—A component-based framework for transparent fault-tolerant CORBA". In Software—Practice and Experience. vol. 32, No. 8, pp. 771-788. Jul. 10, 2002.

Office Actions of File History of U.S. Appl. No. 11/541,963 dated Sep. 13, 2013, Oct. 5, 2010, Jun. 23, 2010, May 26, 2009, and Oct. 1, 2008 (104 pages).

Office Actions of File History of U.S. Appl. No. 11/541,857 dated Mar. 2, 2012, May 25, 2011, Dec. 17, 2010, Feb. 18, 2010, and May 13, 2009 (93 pages).

Office Actions of File History of U.S. Appl. No. 11/541,891 dated Feb. 3, 2014, Sep. 9, 2013, Jan. 9, 2013, Jun. 9, 2011, Dec. 27, 2010, Aug. 17, 2010, and Dec. 9, 2009 (214 pages).

Office Actions of File History of U.S. Appl. No. 11/541,996 dated Jan. 6, 2014, Jul. 5, 2013, Jul. 20, 2012, Jan. 6, 2012, Oct. 20, 2010, Mar. 15, 2010, Jul. 27, 2009, and Dec. 2, 2008 (167 pages).

Office Actions of File History of U.S. Appl. No. 11/541,856 dated Jun. 10, 2013, Sep. 16, 2010, Dec. 28, 2009, May 27, 2009, and Sep. 26, 2008 (83 pages).

Veritas "Planning a Microsoft Exchange Server Data Protection Strategy Using Version 8.0 of Backup Exec for Windows NT/2000" Internet Citation, 1999, pp. 1-23, XP002545353.

Form EPO/2001A, EP 06 78 9594, PCT/US06/30928, "EPO Registered Letter" 1 pg.

Amendment/Response for European Search Opinion, EP 06 78 9594, Aug. 18, 2010, 31 pgs.

NSI Software: "NSI Solutions With Microsoft VSS" Internet, [Online] Mar. 2004, pp. 1-8, XP 002545228.

Microsoft: "Volume Shadow Copy Service Technical Reference" Microsoft Technet, [Online] 28 Mar. 28, 2003, pp. 1-18 XP002545229.

Form EPO/2001A, EP 06 80 0986, PCT/US06/30927, "Registered Letter", 1 pg.

Amendment/Response for European Search Opinion, EP 06 80 0986, Jul. 23, 2010, 26 pgs.

Veritas: "Using Veritas Storage Replicator to Protect Microsoft Exchange 5.5 and 2000 Databases" Internet [Online] 2000, pp. 1-25, XP002545424.

Hou et al: "Deploying Microsoft Exchange 2000 with Dell PowerVault SAN 4.0" Internet, [Online] Feb. 2002, pp. 66-74, XP002545445.

* cited by examiner

DYNAMIC BULK-TO-BRICK TRANSFORMATION OF DATA

RELATED APPLICATION

This application is a continuation-in-part of U.S. patent application Ser. No. 11/500,809 filed Aug. 7, 2006 now U.S. Pat. No. 8,161,318, which is a continuation-in-part of U.S. patent application Ser. No. 11/211,056, filed Aug. 23, 2005 now U.S. Pat. No. 7,778,976, which claims the benefit of U.S. Patent Application No. 60/650,556, filed Feb. 7, 2005.

This application is related to the following United States Patent Applications, each of which was filed Aug. 7, 2006: Ser. No. 11/500,864; Ser. No. 11/500,805; Ser. No. 11/500,806; and Ser. No. 11/500,821.

TECHNICAL FIELD

The disclosure herein relates generally to data protection, archival, data management, and information management.

BACKGROUND

Data servers host critical production data in their storage systems. The storage systems are usually required to provide a level of data availability and service availability. Data and service are usually required to be resilient to a variety of failures, which could range from media failures to data center failures. Typically this requirement is addressed in part by a range of data protection schemes that may include tape-based backup of all or some of the production data.

In addition there is typically a need for other servers to concurrently access this same critical production data. These applications include data protection applications, site replication applications, search applications, discovery applications, analysis applications, and monitoring and supervision applications. This need has been addressed by a range of data management schemes, including setting up a specialized analysis server with a replica of the critical production data. Typical data protection and management schemes have some well known limitations. For example, in some cases, direct access to the server could result in instability and performance-affecting loads on the production servers. Other limitations are related to the serial and offline nature of traditional tape storage, which makes access to backed-up data time-consuming and inefficient.

Regardless of the type of backup storage used, some of the most significant limitations of conventional data protection and management stem from the characteristics of the dense data stored by the production system. FIG. 1 is a block diagram of a prior art system 100 that illustrates some these limitations. System 100 includes a production system and a utility system. The production system includes one or more production servers and production databases storing large amounts of dense production data. Dense data is typically stored and transferred in large quantities and is usually in a hard to read format that is not amenable to manipulation by applications or entities other than the production system or applications specifically designed to interface with the production system. Dense data is also referred to as bulk data. On the other hand, item data includes typically smaller data items in a variety of application formats. An example of item data is an Adobe Acrobat™ file or an email message, but there are many other examples. Item data is also referred to as brick data.

An example of a production system includes a messaging system such as Microsoft Exchange™. In the case of Exchange™, client applications that access Exchange™ servers through item interface application programming interfaces (APIs) include application programs (also referred to as applications) such as Outlook™. When a user wishes to access an item, such as an individual email, using Outlook™, the protocol used includes one of a messaging application programming interface protocol (MAPI protocol), Post Office Protocol version 3 (POP3), Internet message access protocol (IMAP or IMAP4), or others. This type of access is appropriate at the item level, but is extremely slow for accessing large numbers of items or performing transfer, search or audit functions directed to items stored in bulk (or in dense data format) on the productions server.

For performing backup functions, the production system includes a backup interface to the production server and database, as well as backup applications. The backup applications are used by a utility system to perform a bulk backup (also referred to as bulk transfer or bulk copy) of the entire production database file. The transferred production database file is stored on the utility system (or elsewhere, but typically off of the production system) as a bulk backup. In order to restore the production database file in the case of failure, the backup applications are used to transfer the bulk backup to the production server.

If data at the item level is required to be accessed from a bulk backup (for example to recover a particular "lost" email), the bulk backup must be transferred to the production server, or another location where the backed-up production database can be accessed using the item interface APIs. This is extremely slow, inefficient, and error prone.

To address the problem of access to back-up items, the convention utility system may also perform a separate brick backup by using the protocols previously mentioned to access the bulk production data through the item interface APIs (MAPI, SMTP, POP3, etc.). Because this is again very slow, it is typically done on a very limited basis. For example, only executives in an enterprise might have their messaging communications protected by brick backup. Brick backup involves accessing the production database directly using MAPI or SMTP, for example, to retrieve item data. This is a slow process that loads the server and may affect server performance. When an item in the brick backup is required to be accessed or restored, it is accessed using the item interface APIs and protocols previously listed.

Accessing the production database separately for both bulk backups and brick backups increases the load on the production system and may negatively impact performance. Also, maintaining two sets of backup data (bulk and brick) that are not reconciled is error-prone, and may not satisfy various compliance requirements. Further, in conventional systems, there is no mechanism for individual enterprise users to find and restore their own lost or deleted data. This increases workload for information technology (IT) personnel.

Conventional utility systems are not able to completely backup production data while at the same time allowing efficient access to that data in a usable (item) format. Some existing applications are designed specifically to perform functions such as auditing and legal discovery, but these typically read data off of the production system, negatively impacting its performance. Other existing applications painfully and slowly build archives of brick items extracted from the production database using MAPI or SMTP.

There is an increasingly urgent need for the ability to completely backup production data while at the same time allowing efficient access to that data in a usable (item) format. For example, enterprises are increasingly required to preserve and provide access to production data for auditing purposes, monitoring purposes, legal discover purposes, and other purposes.

INCORPORATION BY REFERENCE

Each publication and patent application mentioned in this specification is herein incorporated by reference in its entirety to the same extent as if each individual publication or patent application was specifically and individually indicated to be incorporated by reference.

DETAILED DESCRIPTION

Figure 1:
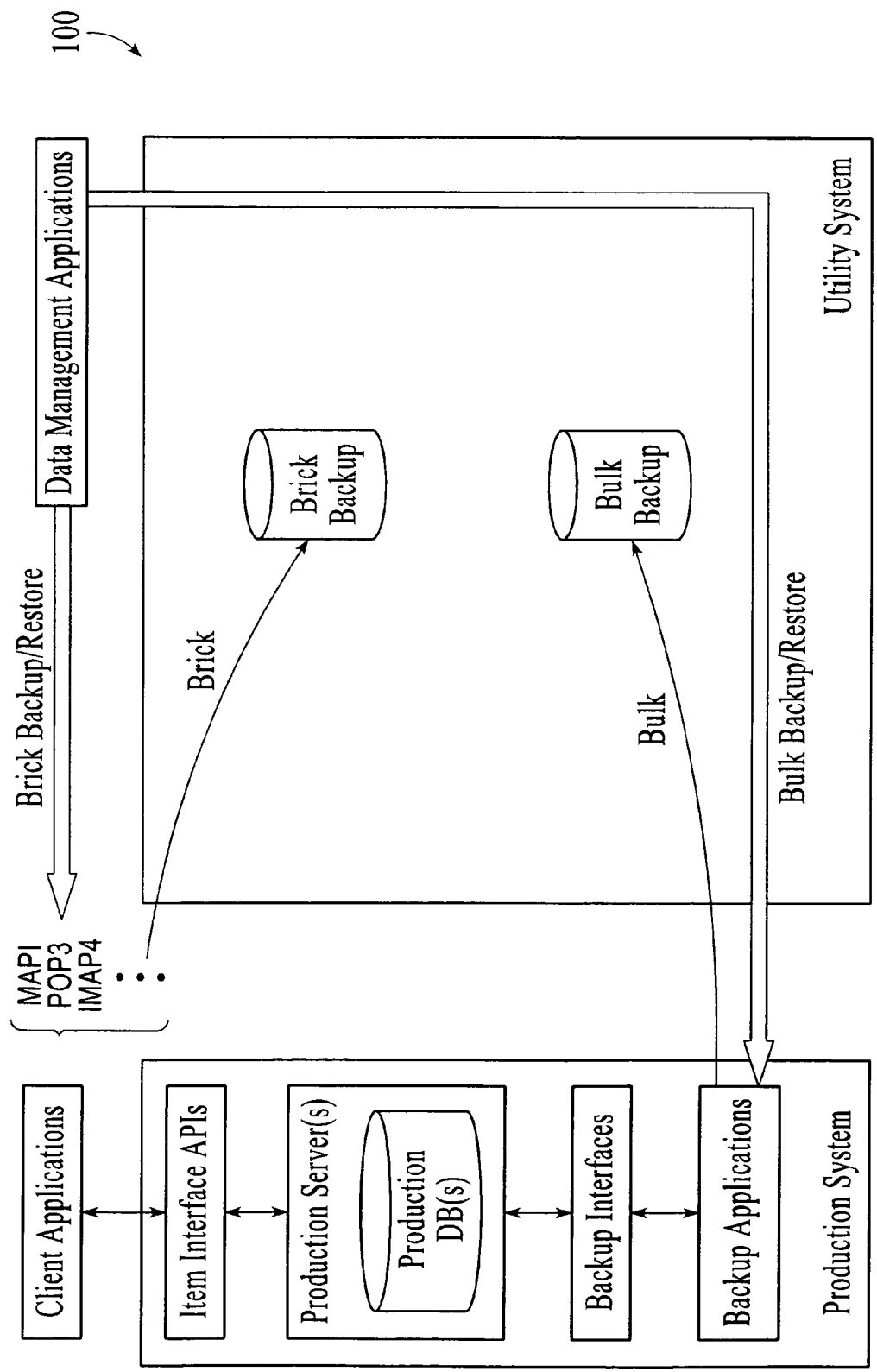
FIG. 1 is a block diagram of a prior art system, including a utility system.

Multi-dimensional data surrogation and corresponding systems and methods are described herein. Embodiments described herein perform shadowing of production server databases, including creation of synthetic fulls by retrofitting log shipping to systems, including database systems, enterprise database systems, or other systems, that do not have log shipping capabilities. For example, the shadowing described herein can be used to integrate log shipping capability with non-relational databases or databases of file system data.

Shadowing maintains an off-host copy of up-to-date enterprise production data for purposes that include one or more of protection, archival and analysis. Shadowing optionally leverages lower-level mechanisms such as backup, replication, snapshots, or continuous data protection (CDP) to construct an aggregate system and method for making near real-time production data available to applications in a manner that is non-disruptive to the production host, while at the same time being trusted, scalable and extensible. In an embodiment, shadowing includes receiving a copy of original data from the production system, including an initial copy of a production database. Delta data is received from the production system in multiple instances. The delta data includes information of changes to the original data. An updated version of the copy is generated and maintained by applying the delta data as the delta data is received. In an embodiment, the delta data includes log files, but embodiments are not so limited. The delta data includes data of an incremental difference, or alternatively, of a differential difference between the original data at different instances.

Embodiments of data surrogation enable a host of open-ended data management applications while minimizing data movement, latencies and post-processing. Embodiments provide protection of data, while storing the data in such a way as to be easily located and accessed. Application-aware one-pass protection and data management is described, including production server database shadowing using log shipping for creation of synthetic full copies (also referred to herein as "synthetic fulls") of the database, and efficient, dynamic transformation of the copied data from "bulk" form to "brick" form. The transformation is dynamic in that the bulk-to-brick process can be run on a regular, ongoing basis to transform the shadowed database. The shadowing process keeps a shadowed copy of the production database up-to-date on a near real-time basis because log files can be applied as soon as they are generated by the production system. This results in an accessible, accurate archive that reflects changes to production data in near real-time.

There are many advantages provided by the embodiments described herein as compared to prior systems that do not inherently include log shipping. For example, when performing synthetic fulls, any corruption is catalyzed right away. This is in contrast to typical systems with disc-based or tape-based backup. In typical system, full copies of the database and incremental updates to the database (in the form of log files) are saved. In the case of a production server failure, the log files must typically all be applied at once. If a corrupted file is encountered, or anything causes the process to fail, it is not possible to access either the "primary" production server or the back-up data.

Another advantage provided by embodiments described herein is the use of less storage space. Significantly less storage space is used to store log files because, in contrast to prior systems that merely store log files, the log files are consumed as they are generated according to various intervals, schedules, events, etc.

Storage of the application-aware brick data is also described, including facilitating easy access to the brick data in desired end-user formats through friendly user interfaces for "self service access", including individual user access, auditor access, monitoring and supervision access, and more.

The application-aware brick data is accessible in an embodiment using a pre-existing messaging application, such as Microsoft Outlook, while custom applications can be written in other embodiments. In an embodiment, the brick data transformed from production bulk data is extracted from the bulk data and stored as indexed items in an indexed item repository, while associated metadata is extracted and stored in another database such as a SQL server database.

Embodiments of the invention include components of a utility system that provide complete information management for production data. Information management integrates item search and recovery functions, audit functions, monitoring and supervision functions, legal discovery functions, compliance functions, archival functions, backup functions and disaster recovery functions. Information management enables all of these functions, and more by performing one-pass protection and data management that includes transforming unstructured or semi-structured data in bulk format to application-aware item format and storing it in an accessible manner. The one-pass protection and data management methods are performed off of the production system (or host system), so that no performance degradation results.

Figure 2:
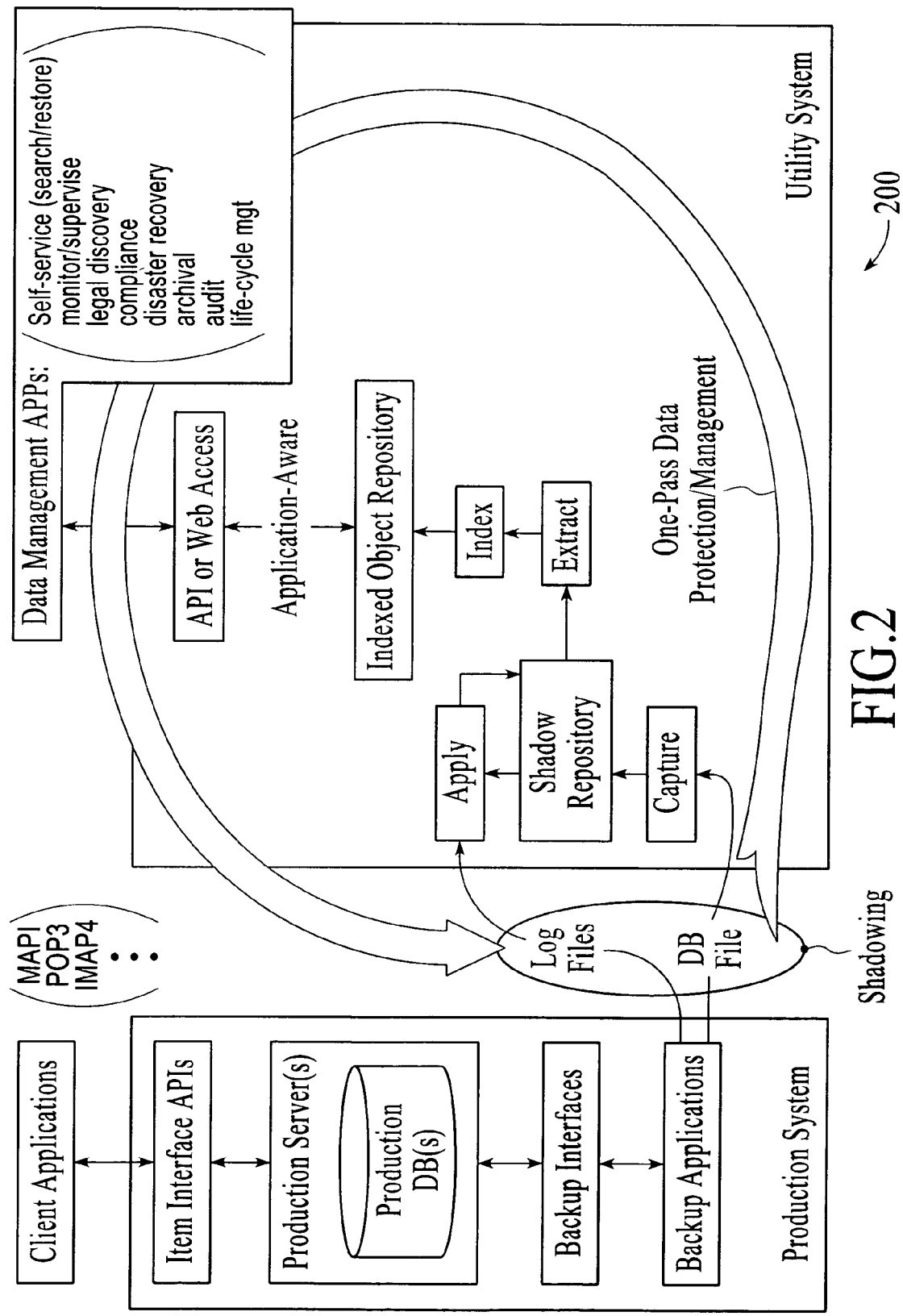
FIG. 2 is a block diagram of a data surrogation system performing one-pass protection and data management, according to an embodiment.

FIG. 2 is a block diagram of a data surrogation system performing one-pass protection and data management, according to an embodiment. Data surrogation as described with reference to different embodiments herein includes systems and methods that enable a range of data management solutions for production servers and enhanced capabilities for production server clients.

The system 200 includes a production system and utility system. An example of a production server is any server usually referred to as an enterprise server, but embodiments are not so limited. For example, a Microsoft Exchange™ server is used as one example of a production server. The production system includes high-level item interface APIs for facilitating accessing items in the production database (also referred to as a database file) by client applications (also referred to as clients). Clients include any client device or application that provides end-user access to production or enterprise servers. An example of a client is Microsoft Outlook™ but the embodiments described herein are not so limited. The clients communicate with the item interface APIs using appropriate protocols. In the case of a production server that is a messaging server, these protocols include a messaging application programming interface protocol (MAPI protocol), Post Office Protocol version 3 (POP3), Internet message access protocol (IMAP or IMAP4), or others.

The production system further includes one or more low-level backup interfaces and corresponding backup applications for allowing users to copy some or all of the data in the production database in bulk form for backup purposes or other purposes.

The system 200 also includes a utility system. The utility system shadows production data after it is produced, as described further herein. Shadowing results in a near real-time, accurate copy of the production database being readily available at all times. The near-real-time, accurate copy of the database is used in various embodiments for many purposes ranging from disaster recovery in the case of complete failure of the production database to creation of an indexed object repository including easily accessible brick-level (item level) archive of the production database.

Shadowing includes transferring the database file from the production system, as well as transferring log files on a regular basis from the production system. A capture component transfers the database file, either entirely or incrementally, from the production system to a shadow repository of the utility system. An apply component applies the log files on a near continuous basis to keep the transferred database file up-to-date. An extract component, to be described further below, dynamically extracts items from the shadow repository. The extract component, in an embodiment, traverses the structure of the database file to identify and extract items and metadata. An indexing component indexes each item so that later searches of the indexed item repository are efficient and intelligent. The frequency with which the extract component operates on the shadow repository is configurable. For example, the extract component is configurable to operate every 30 minutes after a production database is initially captured and logs are initially applied. The frequency could be greater or less, and could be set depending on the frequency with which new log files are available from the production system, for example. Alternatively, the extract component can operate on an event-driven basis, such as whenever a new log file, or a certain number of new log files are available. The result of the dynamic apply and extract processes is an easily accessible, accurate archive reflecting changes to the production database in near real-time. The extract component an also be invoked on demand.

In various embodiments, described for convenience herein with reference to a Microsoft Exchange™ example, the extract and indexing components include many features that optimize performance. These features include single instancing items such that identical items are not stored more than once, thus conserving storage space. These features further include detection of changes to items, including covert changes, and detection of moved items. Embodiments described herein provide a complete solution for storing data in an application-aware manner for archival, replication, disaster recovery, etc. that also offers verifiable non-repudiation, verifiable chain-of-custody, and more.

As shown in FIG. 2, the indexed object repository is accessible to a host of data management applications through various APIs or through web access. Applications/functions accessing the indexed object repository include, but are not limited to, individual self-service to item data, monitoring and supervision, legal discovery, compliance, disaster recovery, archival, auditing, and life-cycle management.

Throughout the disclosure, where a database is shown or described, one or more corresponding servers are implied, even if not shown or described. For example, a production database implies a production server, and a utility database implies a utility server. In various embodiments described herein, the utility server is a near-line server including the data surrogation or shadowing methods and apparatus described and claimed herein. Embodiments of the data surrogation or shadowing methods and apparatus described include products available from Mimosa™ Systems, Inc., of Santa Clara, Calif., including the NearPoint™ for Microsoft® Exchange Server Disaster Recovery Option. Embodiments of the data surrogation or shadowing methods and apparatus include an add-on module that integrates with a near-line server. In an embodiment, the near-line server is a NearPoint™ server, available from Mimosa™ Systems.

Shadowing generates shadow data that provides a relationship between the production data on the enterprise production system and the data on the utility system. The utility system stores the shadow data in a shadow database, also referred to as a shadow repository. The utility system can optionally leverage near-line storage to reduce costs.

In an embodiment, shadowing is a method that maintains a relatively up-to-date copy of production enterprise data in a data surrogate, which in this case includes the shadow database. This data may be optionally translated into multiple alternate formats and augmented with metadata.

The production and/or utility systems can be single computers or they may be clustered, replicated and/or distributed systems. The production and/or utility systems can be in the same data center or they can be remote. In an embodiment, the primary connectivity between the production system and the utility system is through a local area network (LAN), a metropolitan area network (MAN) or a wide area network (WAN). An optional storage-area network (SAN) can be used for the data access and data movement.

As referred to herein, clients and servers can be any type and/or combination of processor-based devices. Reference to a system and/or a server in the singular tense may include multiple instances of that system or server. Couplings between various components of the system embodiments described herein can include wireless couplings, wired couplings, hybrid wired/wireless couplings, and other network coupling types, as appropriate to the host system configuration. The network components and/or couplings between system components can include any of a type, number, and/or combination of networks and the corresponding network components including, but not limited to, a wide area network (WAN), local area networks (LAN), metropolitan area network (MANs), proprietary network, backend network, and the Internet to name a few. Use herein of terms like transport, interconnect, or network is inclusive of a conventional Ethernet, a Storage Area Network (SAN), and/or other type of network. The protocols may be inclusive of Transmission Control Protocol (TCP)/Internet Protocol (IP) (TCP/IP) and layered protocols, Internet Small Computer System Interface (SCSI) (iSCSI), Fibre Channel, InfiniBand, HyperTransport (HT), Virtual Interface (VI), Remote Direct Memory Access (RDMA), and a range of other protocols.

Figure 3:
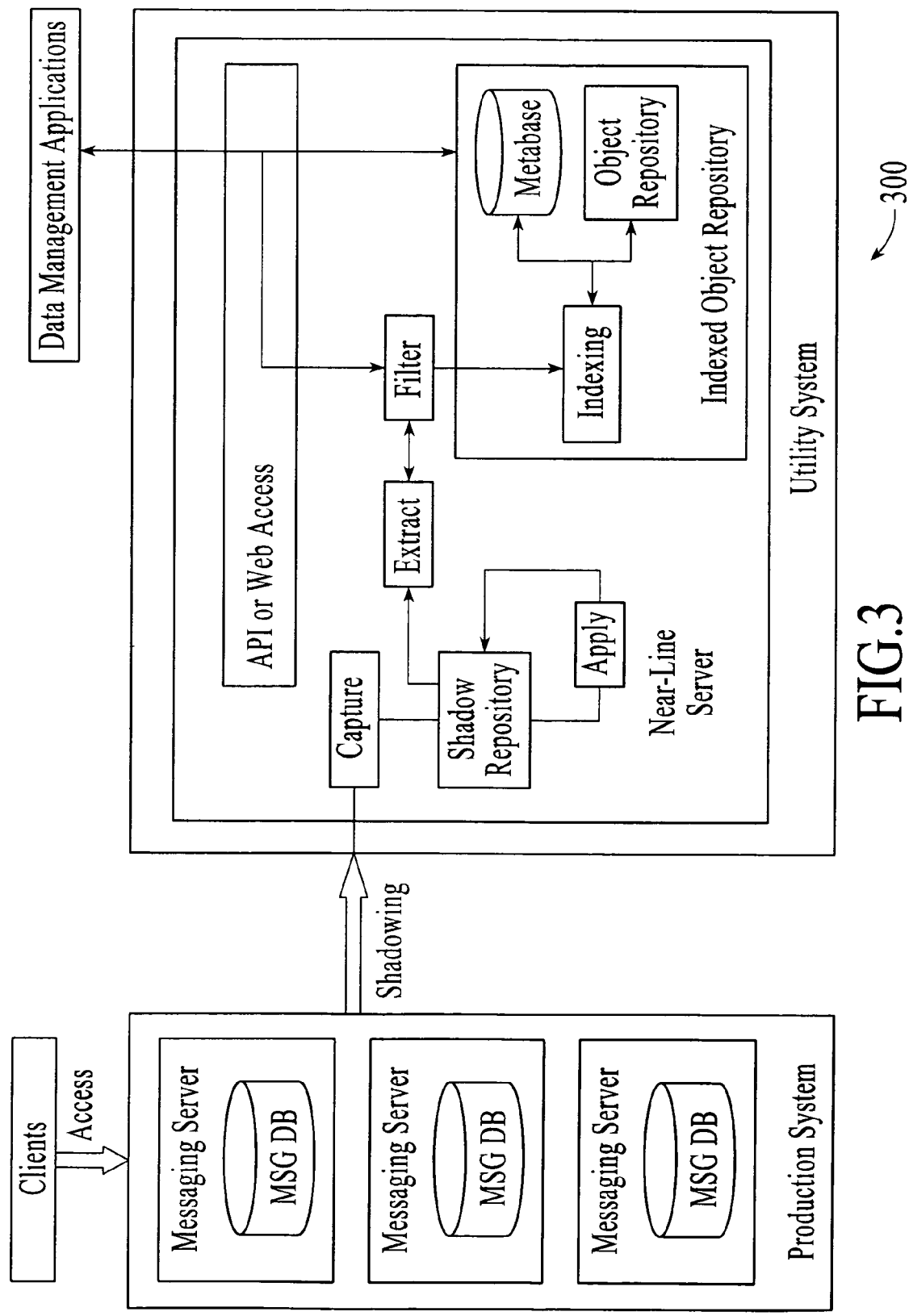
FIG. 3 is a block diagram of a data surrogation system that includes a production system with multiple production servers and corresponding databases according to an embodiment.

FIG. 3 is a block diagram of a system 300 that includes a production system with multiple production servers and corresponding databases. In an embodiment, the production servers are messaging servers, and the databases are messaging databases, but embodiments are not so limited. Production servers can include messaging servers, collaboration servers, portals, or database servers. Production servers host a variety of structured, semi-structured, and unstructured data. These servers may be individual, clustered, replicated, constituents of a grid, virtualized, or any combination or variation. An example that is used for illustration purposes is a Microsoft Exchange™ Server but the embodiments described herein are not so limited.

A utility system includes a shadow repository, as previously described. The shadow repository includes shadow data that is received from one or more of the messaging databases. A capture component obtains a copy of production data, and an application (or "apply") component keeps the shadow data up-to-date, as further described below.

The capture component is configured to reduce disruption of production system operations. The capture component is able to capture the production data in a scalable and high-performance manner, securely and reliably. The data captured may be referred to variously herein as data, production data, the production database, etc. In general, the data captured is a production database file that includes one or more of application data, databases, storage groups, mailbox data, and server data.

The capture component supplies data to the shadow repository to keep the shadow copy as up-to-date as possible with high efficiency and low cost. The capture component can include backup, snapshots, replication, and continuous data protection (CDP) methods but is not so limited. Various capture components configured for use in an embodiment are described in detail below.

The apply component is intrinsic to a data type in an embodiment. In an alternative embodiment, the apply component is retrofitted to work with the particular data type. Typically enterprise applications reside on relational databases. Relatively more capable databases such as Oracle™, DB2™ and Microsoft SQL™ Server offer log shipping mechanisms that facilitate direct re-use for application. However relatively less-capable databases and/or other semi-structured or unstructured data do not include log shipping capabilities. Microsoft Exchange™ Server is an example of an enterprise server that resides on a database that does not support log shipping. The shadowing described herein provides log-shipping capability in support of the shadowing of databases and/or other semi-structured or unstructured data.

An extraction (or "extract") component of an embodiment optionally transforms data formats from a relatively dense application format to a format that is directly usable by data management applications. The extract component provides high-performance, scalable, lossless, flexible and extensible data transformational capabilities. The extraction capabilities described herein are provided by systems such as the Microsoft Exchange™ Server. For example, the Microsoft Exchange™ Server provides a MAPI and protocol that is relatively difficult to deploy on a remote utility or management server, and generally does not meet the performance and scalability requirements of management applications.

An indexed object repository (IOR) includes extracted (or transformed) data objects in an object database, and metadata related to the objects in a metadata database (also referred to as a metadata repository, or "metabase"). As used herein, object denotes a data item in an application-aware format. An example of an object stored in the object database is an email message body, but there are many other examples.

An optional filter provides the data management applications with an API or Web Service capability for tuning or parameterizing the extract process.

An optional indexing mechanism operates on the data and metadata in the indexed object repository looking for patterns and relationships. When the indexing mechanism finds relevant information, it enhances the metadata with this new information. Optionally the indexing mechanism may be guided by a data management application through the filter.

In an embodiment, data management applications have API or Web Service access to the aggregate data as it is being semantically indexed. For examples, the data management applications can get proactive notifications and callbacks when relevant additional data or metadata has been added to the indexed object repository. In an embodiment, the utility system is actively involved in influencing, guiding, participating in, or extending the function of the production servers. Applications that are part of the utility system can become active or passive participants in the production server workflow through positive or negative feedback loops and augmentation of the production server function to solve existing pain points or improve productivity through value additions.

The embodiment of FIG. 3 includes a configuration with three messaging servers and one near line server. Other deployment variations are possible, including a variable number of homogeneous or heterogeneous production servers, and a complex near line server that may be clustered, distributed, part of a grid, or virtualized. Although FIG. 3 shows three messaging servers, it is possible to provide equivalent services to multiple, arbitrary homogeneous heterogeneous servers. Although FIG. 3 shows a single near line server, it may in actuality be clustered, distributed, replicated, virtualized, and may straddle multiple machines or sites.

Embodiments of a shadowing method are described herein with reference to an example host system. The shadowing is described in the context of providing log shipping of the application component for a Microsoft Exchange™ Server as an example, but the shadowing described herein is not limited to the Microsoft Exchange™ Server.

Figure 4:
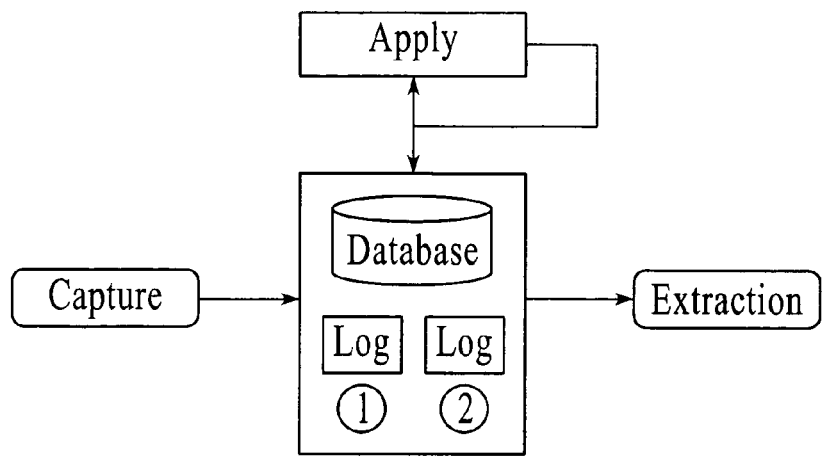
FIG. 4 is a block diagram showing a capture operation, an apply operation, and an extraction operation according to an embodiment.

FIG. 4 is a block diagram showing a capture component, an apply component, and an extract component under an embodiment. The capture component generates or provides a baseline full copy of the production data. This full copy data can be directly passed to an extract component for converting the dense application format into another format desirable to post-processing entities. This conversion process is also referred to herein as extraction, or bulk-to-brick transformation.

An embodiment can optionally include cleansing and/or repairing of the full copy data prior to the extraction when the capture component does not provide application consistent data. In embodiments to be further described below, log files ("logs" 1 and 2 are shown as an example) are shipped from the production system as they are generated, and are applied to the full copy to keep it up-to-date as a shadow copy of the production database.

Figure 5:
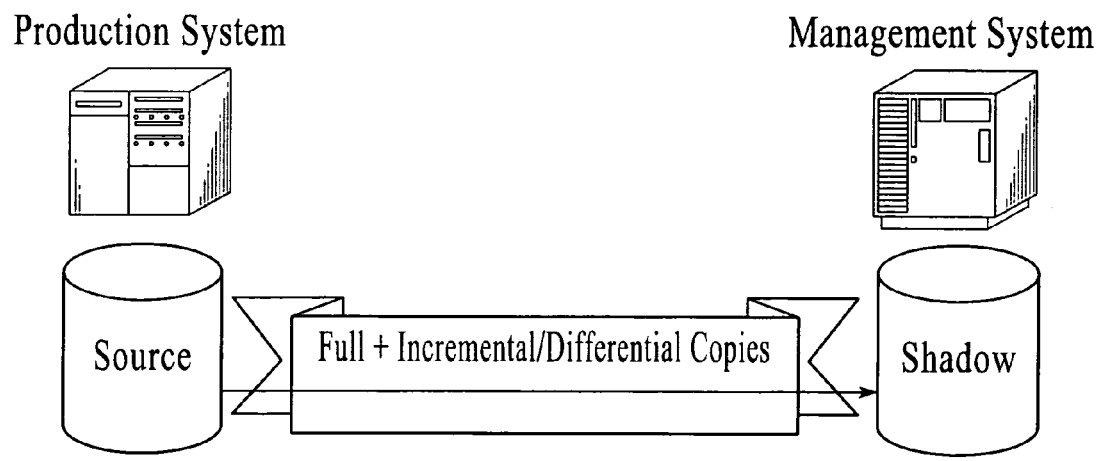
FIG. 5 is a block diagram of backup capture used in shadowing, according to an embodiment.

The capture component of shadowing is configured to use one or more data capture capabilities that can include backup, snapshots, replication, and/or continuous data protection. FIG. 5 is a block diagram of backup capture used in shadowing, under an embodiment. The backup capture uses the backup APIs provided by the application running on the production system. In this example the production system is Microsoft Exchange™ Server but is not so limited. The utility system is configured to obtain occasional full backups and frequent incremental or differential backups. Both these mechanisms typically run on a default or administrator-configured schedule. There are other enhancements or variations that include the ability to detect that new log files have been generated on the production system and pulling a copy over ("dynamic log shipping") or mechanisms for "tailing" the log files as they are being written on the production system.

Figure 6:
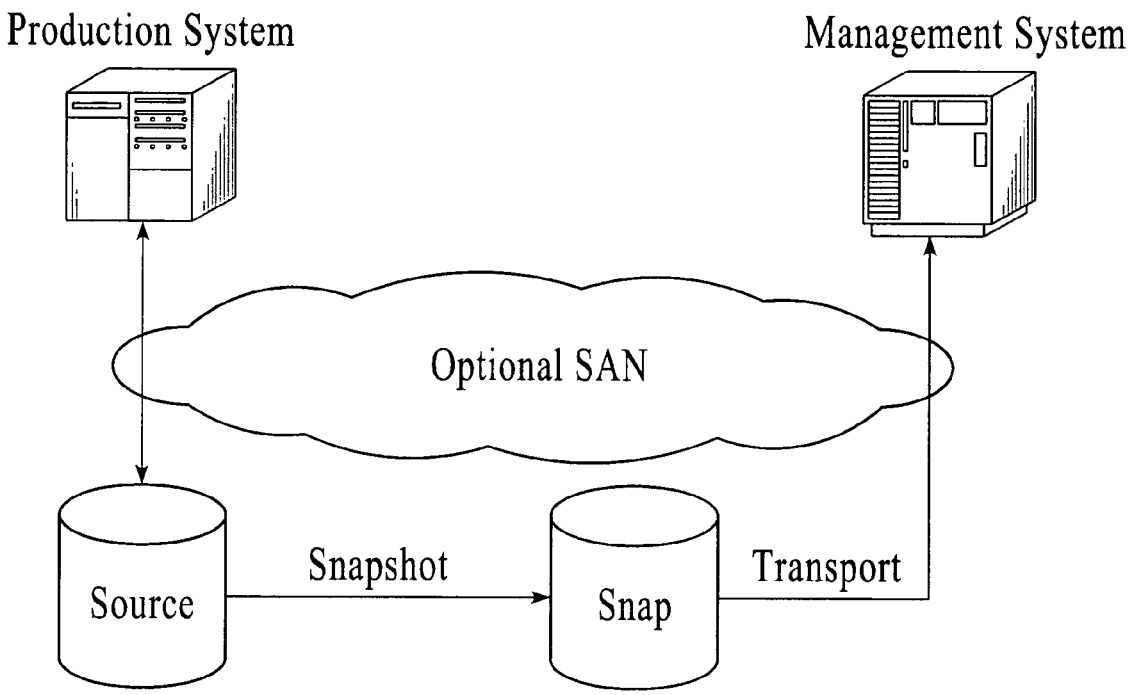
FIG. 6 is a block diagram of snapshot capture used in shadowing, according to an embodiment.

FIG. 6 is a block diagram of snapshot capture used in shadowing, under an embodiment. The snapshots of snapshot capture are either crash consistent or application consistent. Typically "hot split" snapshots that are obtained by breaking mirrors without application involvement tend to be crash consistent. An example of an application consistent snapshot mechanism is Microsoft Data Protection Manager™. The snapshots can either be local, which requires the management server to be co-located in the same data center, or the snapshots can be remote. The production and utility systems can be single computers, or they may be clustered, replicated and/or distributed. The transports for control and communication are typically LAN, MAN or WAN. An optional SAN can facilitate efficient data movement.

For snapshots that are crash consistent, additional mechanisms can be used to validate the snapshots for consistency (and perhaps repeat the process until a reasonably consistent copy is available). The additional mechanisms can cleanse and/or repair the data in order to make it ready for application.

Figure 7:
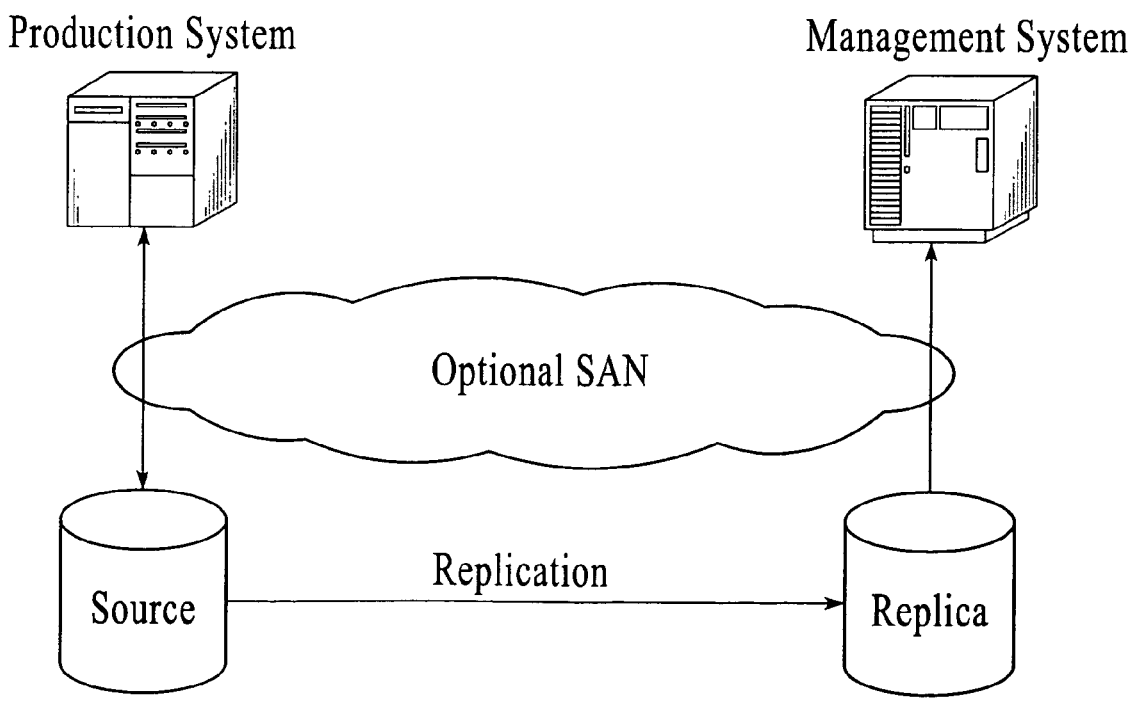
FIG. 7 is a block diagram of replication capture used in shadowing, according to an embodiment.

FIG. 7 is a block diagram of replication capture used in shadowing, under an embodiment. The replication can be local within a data center, or it can be remote over a MAN, WAN or SAN. The replication maintains a replica on the utility system that can be used for capture. Conventional replication shares the characteristics of crash consistent mirrors, and the replication can be annotated by an "event stream" that captures points in time that are likely to be application consistent. The production and utility systems can be single computers, or they can be clustered, replicated and/or distributed. The transports for control and communication include LAN, MAN and/or WAN. An optional SAN can facilitate efficient data movement.

The capture of production data using replication includes use of replication techniques that capture every relevant write at the source (e.g., the production system) and propagate the captured writes to the target (e.g., the utility system) to be applied to the copy of the data to bring it up-to-date. This replication can be synchronous, asynchronous, or a quasi-synchronous hybrid. The production and utility systems may be single computers, or they may be clustered, replicated or distributed. As in the case of snapshot capture, additional mechanisms can be used to validate the snapshots for consistency and cleanse and/or repair the data in order to make it ready for application.

Figure 8:
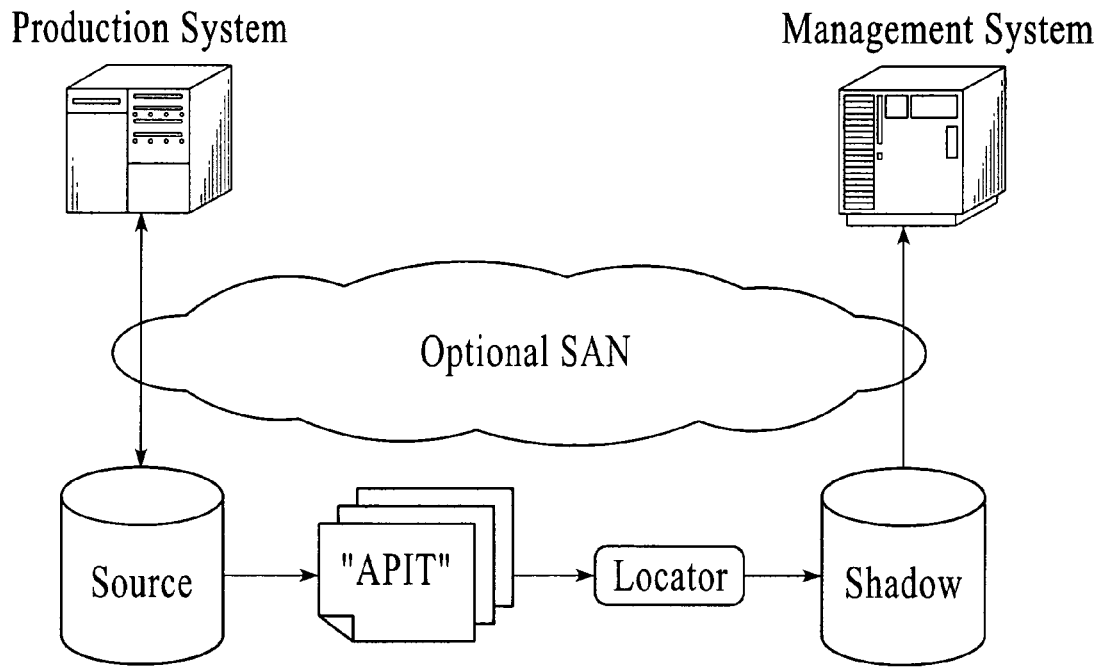
FIG. 8 is a block diagram of continuous data protection (CDP) capture used in shadowing, according to an embodiment.

FIG. 8 is a block diagram of CDP capture operation used in shadowing, under an embodiment. A capture component provides a stream of changes that have occurred on the production system, and provides the ability to move to "any point in time" (APIT). The stream of changes (APIT) of an embodiment is annotated with an event stream that synchronizes with events on the production system. A locator module can be configured to select the most appropriate points in time for use for application. The production and utility systems can be single computers, or they can be clustered, replicated and/or distributed systems. The transports for control and communication include LAN, MAN or WAN. An optional SAN facilitates efficient data movement.

Figure 9:
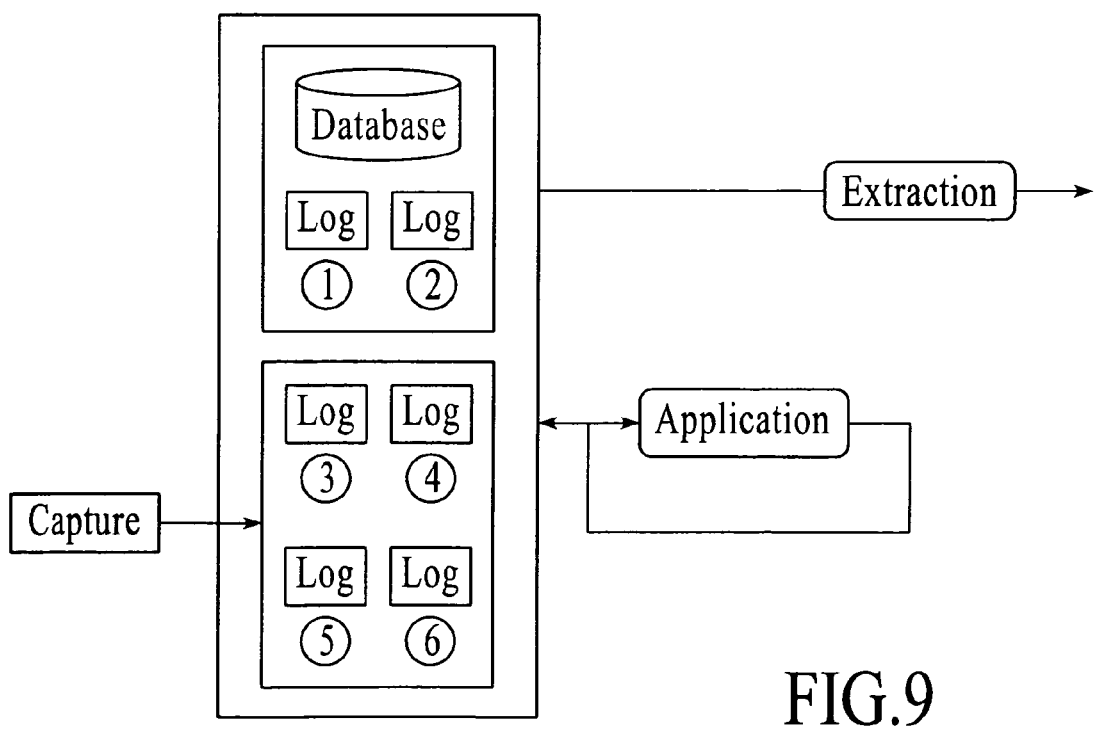
FIG. 9 is a block diagram showing generation of an incremental or differential update of log files from a production system, according to an embodiment.

FIG. 9 is a block diagram showing generation of an incremental or differential update of log files from the production system, under an embodiment. The updating of log files (also referred to herein as logs or transactional logs) includes adding data from the capture operation to the shadow repository with the previous database and logs. The update of logs includes an apply, or log apply operation (also known as log shipping) that applies the logs to the database to bring it up-to-date.

The update of logs can optionally include an extract, or bulk-to-brick transformation operation, as further described herein. The extract operation is performed on the data resulting from the log apply operation to transform the resulting data from dense application format to one or more target formats for subsequent consumption by various data management applications.

Figure 10:
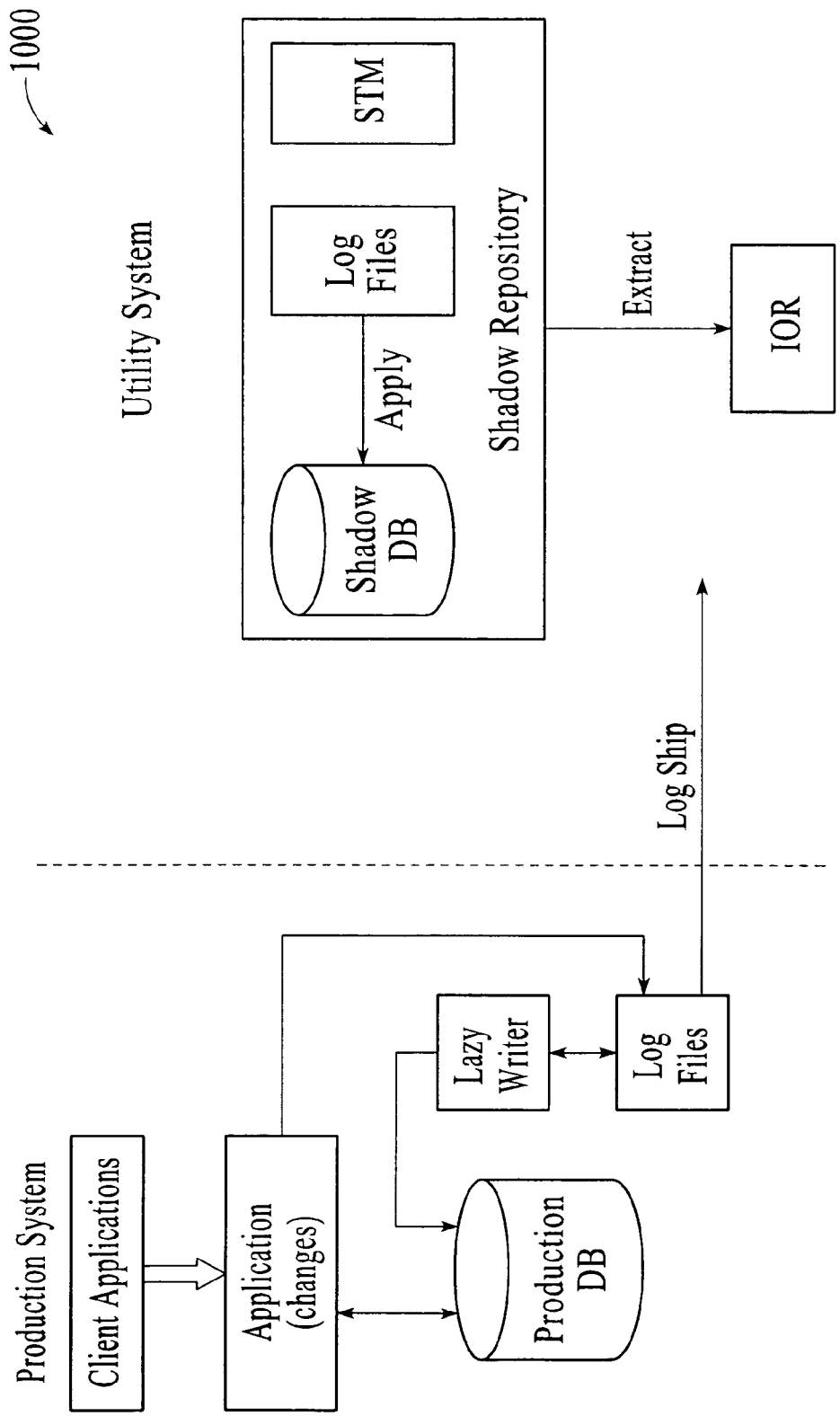
FIG. 10 is a block diagram of a system that includes shadowing using retrofitted log shipping to create synthetic fulls according to an embodiment.

FIG. 10 is a block diagram of a system 1000 that includes shadowing using retro-fitted log shipping to create synthetic fulls according to an embodiment. System 1000 includes a production system that performs write-ahead logging. For purposes of illustration, FIG. 10 will be described with reference to Microsoft Exchange™ as a component of the production system, but embodiments are not so limited. The production system includes a Microsoft Exchange™ server and a Microsoft Exchange™ database, in an embodiment. The production system includes one or more databases, although only one is shown.

An application communicates with the production database (which, in the case of Microsoft Exchange™ is called an Exchange database or EDB). When the application detects a change to the database, it performs write-ahead logging to a log file. This includes appending information to the log file, which is much faster than traversing the database structure and updating the database each time there is a change. The information appended to the log file reflects the particular change made to data in the database.

A lazy writer takes all of the logged, but not committed, changes to the database and writes them to disc. One reason to use these log files is if the system suddenly crashes, the system can replay the log files when it comes back up, thus recovering all the lost data. Write-ahead logging is usually used for database systems, but other systems may have different ways of handling changes to data.

Another way of using log files in database systems is for creating a mirror database to provide a backup in the event of server loss or site loss. This is referred to variously as log shipping, log-apply, or synthetic fulls. Any of these terms imply various methods that take incremental changes to a production server and apply them to a database copy on a utility server to bring the copy up-to-date. Log shipping is not supported by some systems, including Microsoft Exchange™. The inability to support log shipping introduces significant limitations on data backup operations, data archiving operations, and data discovery operations. For example, conventionally, third-party applications designed to provide data backup, data archiving and data discovery operations to Microsoft Exchange™ (or other systems without log shipping capabilities) go into the EDB and obtain the bulk version of the database. If such an application repeatedly obtains the bulk database without applying the log files, many databases and many log files are accumulated, which becomes very cumbersome. Then, in order to restore data back to Exchange™, all of the accumulated log files must be applied to the EDB at the time of restoration. This makes the recovery time objective (RTO) of such conventional third-party applications very long.

Performing shadowing with synthetic fulls as described herein allows the log files to be consumed as they are generated, resulting in an improved RTO. In addition, because a copy of the current EDB (including applied log files) is available, extraction and transformation to brick form, according to embodiments to be described, becomes possible.

System 1000 further includes a utility system with a shadow repository and an IOR according to an embodiment. Initially, the production database is copied from the production system to the shadow database on the utility system. In addition, log files are shipped from the production system to the shadow repository as they are generated. The shadow repository in an embodiment also store STM files. STM files are files in a well-known format for multi-media, typically emails.

In an embodiment, each time a log file is generated it is received by the utility system and applied to the shadow database according to a retro-fitted log shipping operation. Alternatively, the log files can be batched before applying. Data in the shadow database is extracted to the indexed object repository in an application-aware manner and stored in such a way as to be easily located and accessed, even by data management applications external to the utility system.

Figure 11:
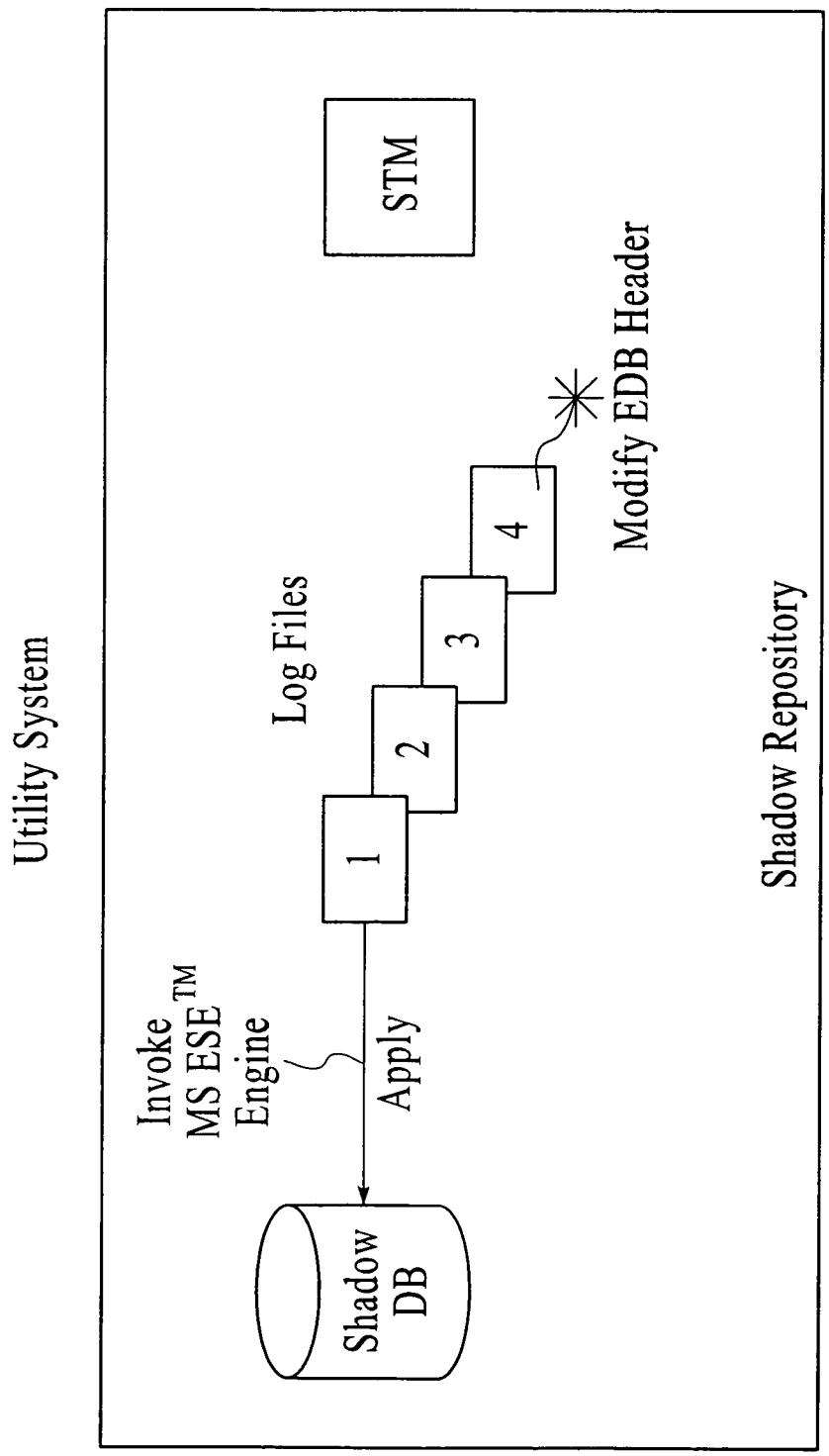
FIG. 11 is a block diagram of a process of obtaining and applying log files, according to an embodiment.

FIG. 11 is a block diagram of a process of obtaining and applying log files, according to an embodiment. The extensible storage engine (ESE) or "engine" (also referred to as a recovery engine herein), used by Microsoft Exchange™, also known as JET Blue, is an indexed sequential access method (ISAM) data storage technology from Microsoft. The engine allows client applications to store and retrieve data via indexed and sequential access. In an embodiment for shadowing a production database, the engine is invoked by the utility system, directed to the database (EDB in this case) and used to facilitate shadowing, including log shipping, and log application.

In an embodiment, an EDB header is made to point to a particular log file number as a starting log file number, and the engine is run. The engine goes through each log file and checks for integrity, for example by checking the checksums. The engine begins applying transactions from the log files into the shadow database. The engine moves through the log files in sequence, applying each log file. For example, log files 1-4 are shown in FIG. 11. When the engine finishes applying the last log file (log file 4), the database enters a "recovered" state which indicates that the data is ready to be restored to the production database. In the recovered state, no more log files can be applied to the database. This state is referred to as "clean shutdown" state in Microsoft Exchange™. This behavior is an artifact from when tape was the dominant backup storage medium. For example, if backups are stored to tape and retrieved from tape, there should never be a need to apply log files more than once. Thus, after a one-time application of log files, the EDB automatically enters a state in which no more logs can be applied. Conventionally, when the production database is backed up, it is transferred in "backed-up" state, which is the state in which log files can be applied. This state is referred to as "dirty shutdown" state in Microsoft Exchange™.

According to an embodiment, in order to apply log files at any time, the EDB is allowed to go into clean shutdown state after the last log file (for example, log file 4). Then the EDB header is modified to indicate that it is in dirty shutdown state. When the utility system is ready to apply a new set of log files, the EDB will be in dirty shutdown state and the engine will be able to apply the log files. This is referred to as toggling the dirty bit(s) in the appropriate header field of the EDB. The EDB and EDB header are specific to certain embodiments, and are not meant to be limiting. In various embodiments, other systems may use different databases in which there are headers or other structural metadata that can be manipulated to achieve the result of allowing application of log files using the database engine as described. The engine may be any recovery engine employed to recover a database including application of changes made to the database, but not yet applied to the database.

Figure 12:
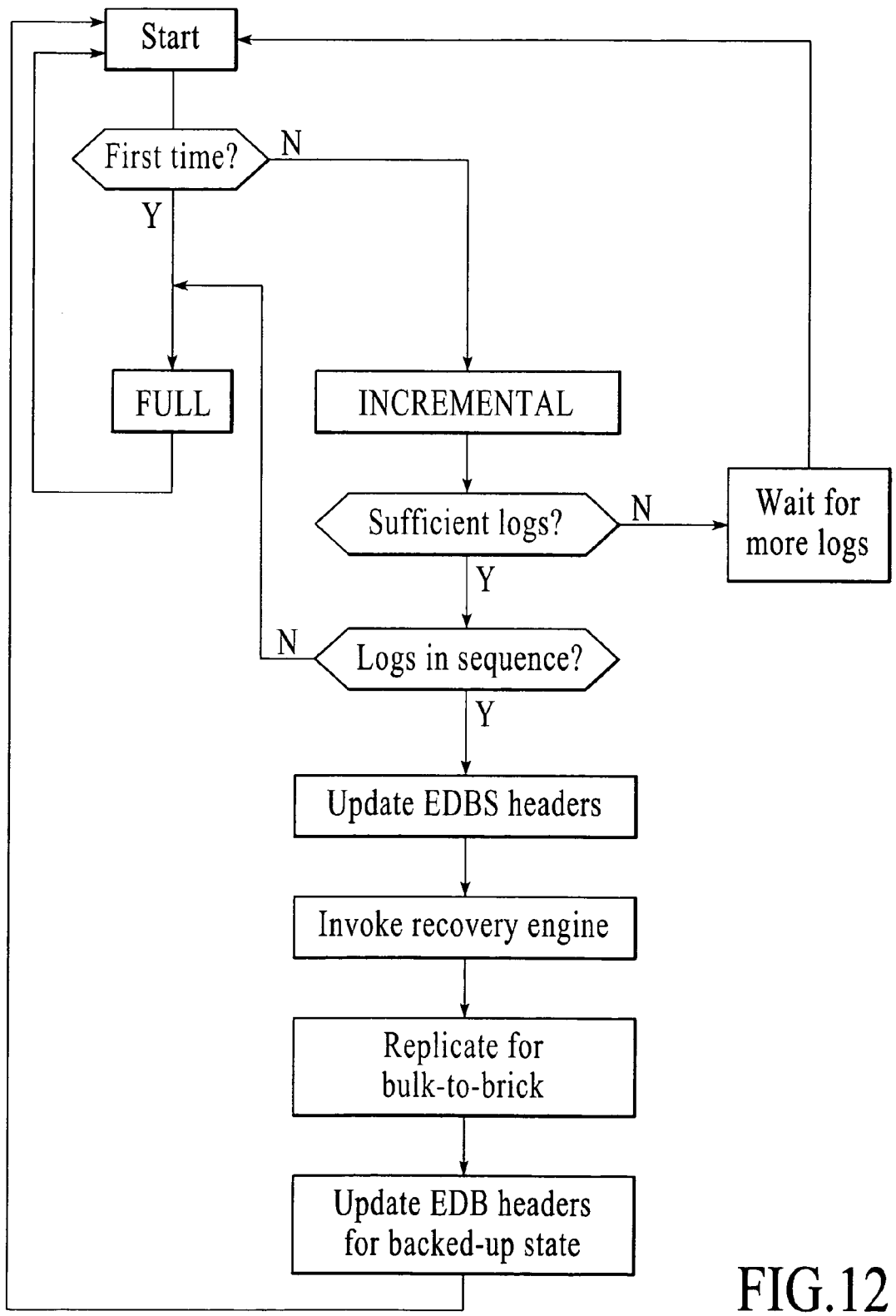
FIG. 12 is a flow diagram illustrating an embodiment of a shadowing process including applying log files according to an embodiment.

FIG. 12 is a flow diagram illustrating an embodiment of a shadowing process including applying log files according to an embodiment. The process starts, and it is determined whether it is the first time the shadowing process has been run. The first time the process has been run may occur when the shadow repository is empty, or when the utility system and/or the shadowing components have just been installed, or when a new repository has been created. If it is the first time the process has been run, a full copy of the production database is acquired. This involves completely copying the production database file into the shadow database.

If it is not the first time the process has been run, an incremental copy is acquired. In order to obtain the incremental copy, it is determined whether there are sufficient un-applied logs present. If sufficient un-applied logs are not present, the process waits for sufficient logs. In one embodiment, this includes going back to the initial starting point. If there are sufficient un-applied logs, it is determined whether the logs are in sequence. If the logs are not in sequence, they cannot be applied, and a full copy of the database is obtained. Alternatively, the production system is accessed specifically to acquire the "missing" log files. Logs must be in sequence because of their nature as multiple transactions that may have interdependencies. In a manner that is analogous to the area of microprocessor instructions, for example, database transactions can be committed or uncommitted.

If there are sufficient log files, the appropriate EDB headers are updated. In practice, there are multiple EDBs, so there are multiple EDB headers. The headers are updated to reference the first log file that has not been applied. The database recovery engine, in this case the ESE, is invoked. The engine is used to replicate the EDB by applying the log files. The replicated EDB is used for later transformation from bulk-to-brick (also referred to as extraction as performed by the extract component) according to embodiments to be later described.

The EDB headers are updated to indicate the backed-up state, or dirty shutdown state, and the process returns to the starting point.

FIG. 12 illustrates an embodiment for a production database system that does not support log shipping. Embodiments are also applicable to other systems, for example file systems. To keep an updated copy of a set of files, the process starts by acquiring a set of all the files. Later, all the files in the file system that have changed are obtained, and the previous copy is overwritten. Alternatively, just the differences can be obtained and applied to the previous copy. That is another example of a synthetic full. Embodiments of retro-fitted log shipping apply to any application data, or unstructured data.

Whether or not log files are retained by the shadowing process, and how long log files are retained depends on whether the log files include any uncommitted transactions. As previously mentioned, each log file could include several transactions and several of the transaction could be outstanding. At some point there is a "begin" transaction, and at another point there is a corresponding "end" transaction. When a "begin" transaction is encountered by the shadowing process, it is bracketed. The brackets are closed when the corresponding "end" transaction is encountered. All of the transactions between the "begin" transaction and a later "end" transaction are saved until it is confirmed that every transaction in the bracketed chain completed successfully. If every transaction did not complete successfully, all of the transactions in the chain are rolled back. Retention of the appropriate log files facilitates rollback. Accordingly, the log files are accumulated, and as they are applied, a check is made for outstanding transactions. If there are no outstanding transactions associated with a log file, the log file is deleted. If there are outstanding transactions associated with the log file, the log file is saved.

Figure 13:
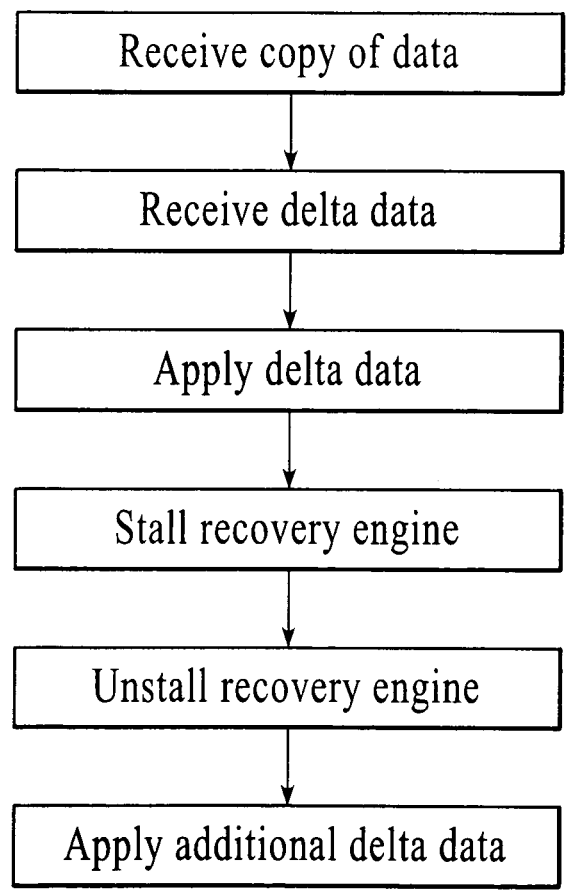
FIG. 13 is a flow diagram of a process of shadowing according to another embodiment.

FIG. 13 is a flow diagram of a process of shadowing according to another embodiment in which a database recovery engine that is part of the production system is directed to a copy of the production data and used to facilitate shadowing and log shipping. In an example, the database recovery engine is part of the Jet Blue Exchange™ database engine, but embodiments are not so limited. FIG. 13 illustrates an alternative to the method described with reference to FIG. 12 for preventing the EDB from entering a recovered state. FIG. 13 illustrates a continuous log apply process according to which the recovery engine is stalled in order to allow the engine to apply logs multiple times.

A copy of the production data is received by an embodiment of the utility system. Initially, a baseline copy of the entire production database file is received and stored in a shadow repository. As delta data is generated by the production system, the delta data is received by the utility system. Delta data is any data that records changes made to the database file. In an embodiment, the delta data is one or more log files. In an embodiment, the log files are shipped to a near line server of the utility system from a remote Exchange™ Server. In an embodiment, the frequency of log shipping is predefined by a schedule, but the frequency could be determined otherwise, such as by an administrator through a data management application, or the log shipping may be event-driven.

The delta data is applied to the copy using the recovery engine. In systems such as Exchange™ that do not have log shipping capability, after logs are applied, the state of the database being operated on is changed to disallow the further application of log files. In an embodiment, the copy is prevented from entering this state by stalling the recovery engine. When additional log files are ready to be applied, the recovery engine is unstalled, and the additional log files are applied.

The process illustrated in FIG. 13 is described in relationship to Microsoft Exchange™. However, the process is applicable to other messaging and collaboration servers. The process is also extensible to generic applications that use structured, semi-structured, or unstructured data. Though this example shows a production database or server, it is possible to provide equivalent services to multiple homogeneous or heterogeneous databases or servers. Similarly, though this example describes a single shadow database, which in an embodiment includes a near line server, in various embodiments, the shadow database may be clustered, distributed, replicated, virtualized, and may straddle multiple machines or sites.

Figure 14:
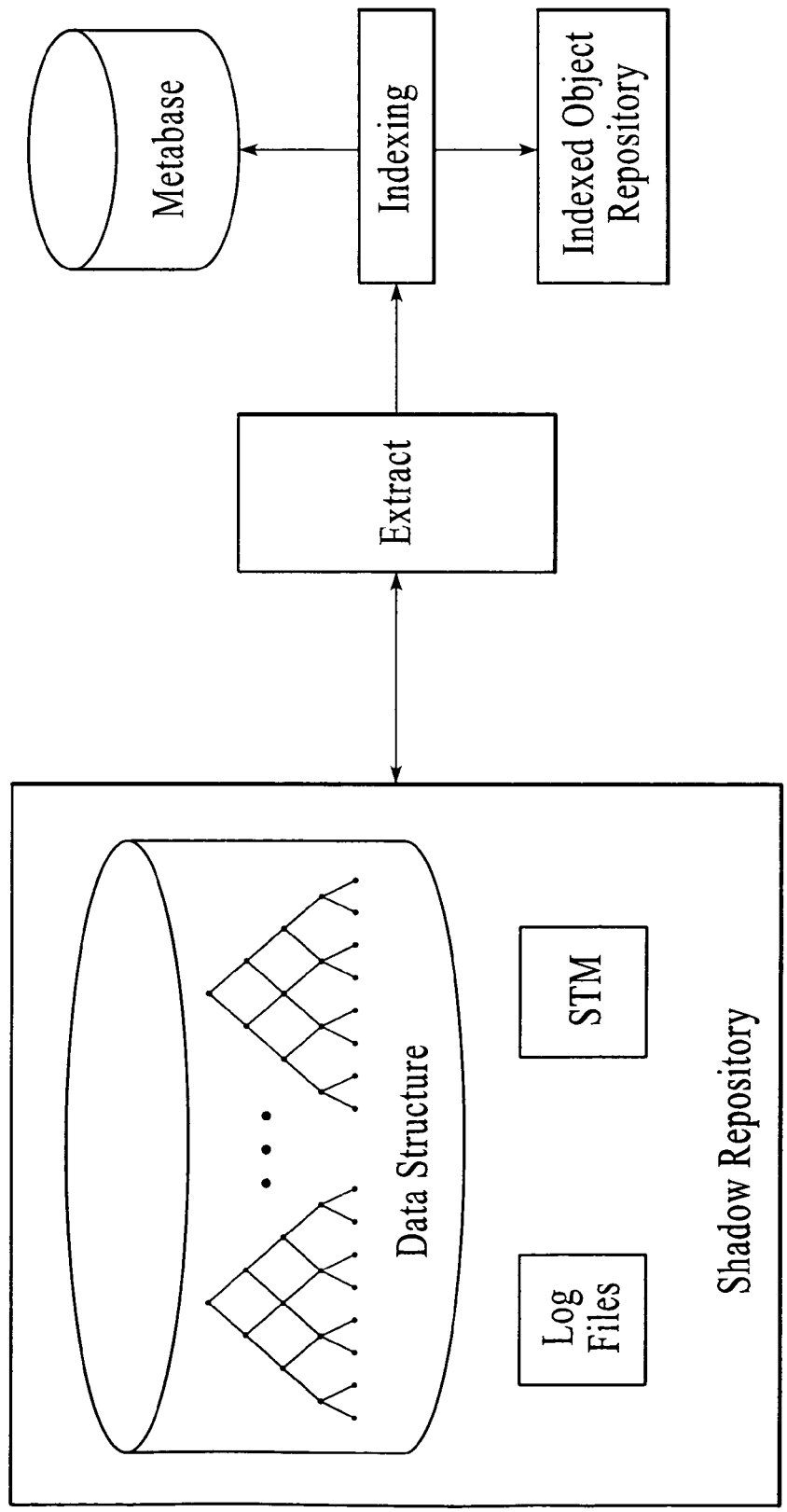
FIG. 14 is a block diagram of a utility system 1400 including an extract component, according to an embodiment.

FIG. 14 is a block diagram of a utility system 1400 including an extract component, according to an embodiment. A shadow repository includes a database file in a bulk format. For purposes of providing an example, the bulk format includes a B+ tree structure, which is a data structure used by Exchange™. Typically only Exchange™ can operate on the database file when it is organized in B+ trees. Also, it is very cumbersome to run Exchange on the utility servers. According to embodiments, the extract component performs a bulk-to-brick process that includes going into Exchange™ data that is captured and hosted on the utility system (for example on a near-line server) in a shadow repository. As previously described, the shadow repository also includes STM files and log files.

The extract component of an embodiment performs a "raw read" method and a "smart extract" method. The raw read method systematically reads the B+ trees, including the data structures, the data tables, and the contents. Because the B+ tree is actually referencing a number of tables (e.g., a mailbox table, a folder table, a message table, and an attachment table) it is possible to do a finite number (in one case four, according to the tree structure) of lookups to reach leaf items. Finding items includes making branch decisions at nodes that are not leaf nodes, until the leaf node is found.

The smart extract method extracts useful items and metadata from a raw structure read out by the raw read method. In an embodiment, the same the same hierarchy found in the database structure is replicated in a directory structure, or filing system. In an embodiment, the directory structure is in the shadow repository (not shown), but embodiments are not so limited. In the directory structure, the items (for example folders, mailboxes, email bodies, email headers, email attachments, etc.) are placed at leaf nodes. Any application can go into the directory structure and look at the items. In an embodiment, the extract component creates a directory for each Exchange™ server encountered, and a directory for each storage group, etc., down to leaf items. In this way the dense data of the database structure is exposed in a file system that can be traversed and searched by any application without performance-degrading access to Exchange™. Actual items (leaf items) may be in any format, such as HTML, Adobe Acrobat™, etc.

Optionally, extracted items are placed in a composite container, such as a ZIP file or a CAB file, for storage.

Optionally, items that are extracted from the production database can be compressed and/or encrypted.

Items extracted from the production database, in an embodiment, are stored in one of many storage locations according to a tiered storage scheme. A location can infer a type of storage medium and/or an actual location. In an embodiment, the tiered storage scheme includes pre-determined criteria for placing items in tiers according to content, age, importance, sender or receiver, and many other criteria. An embodiment includes an algorithm for dynamically determining an appropriate tier for each item to be stored in.

The extract component includes decompression algorithms for decompressing items that are compressed, for example by Outlook™ or Exchange™. The extract component efficiently extracts the data. In an embodiment, the first time an EDB is encountered for the bulk-to-brick transformation, the structure is parsed and multiple extract threads run, each of which takes a mailbox, so that multiple mailboxes are extracted in parallel.

The directory structure that is created by the extract, or bulk-to-brick, process is traversed by the indexing component to perform frill indexing. The indexing component looks for message types, message content, etc. The indexing component creates indices to allow full searching of items. For example, a search could be performed for occurrences of the word "Tabasco". As another example, a search could be performed for users discussing a bug #1550. Such searches are easily performed by the data surrogation system whereas they would be very expensive to perform using Exchange™.

The indexed items are stored in an indexed object repository and the metadata associated with the indexed items is stored in a metabase. The metadata in the production database file indicates the database structure, including locations of data tables are in the database file. There is metadata about the items metadata about indicate such things as which folder is in which mailbox, and so on. There is also metadata about metadata. In an embodiment, the metabase include a SQL server and a SQL database.

Figure 15:
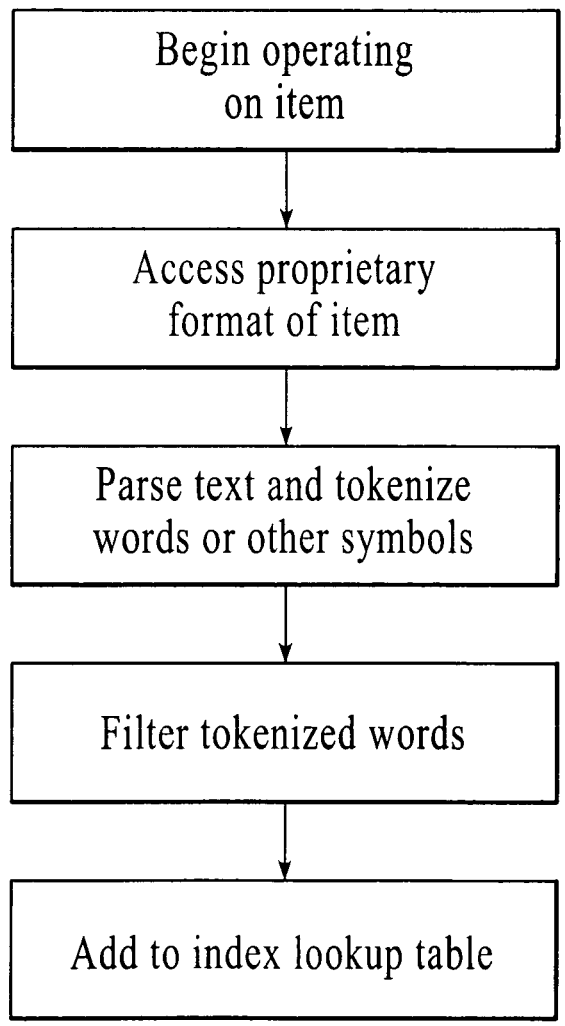
FIG. 15 is a flow diagram of an indexing process, according to an embodiment.

FIG. 15 is a flow diagram illustrating an indexing process according to an embodiment. The process begins operating on a particular item. As an example, an item may be an Acrobat™ file for example. The process accesses the proprietary format of the item, including determining what the format is. The process then parses text of the item and tokenizes words as they are encountered. Words are a common symbol that can be tokenized, but any other symbols included in the format can be tokenized. The tokenized words are filtered. In an embodiment, filtering includes eliminating "noise" words, such as "the", "a", and so on. Filtering could be performed to accomplish excluding or including any words or symbols according to any predetermined filter criteria.

The words of the item that remain after filtering are then used to add to an index lookup table. If a word has been encountered before, it is already included in the table. In this case, a pointer to the "new" location is included in the table. If the word has not been encountered before, it is not in the table, so the word and its associated pointer are both added to the table. In this way, an index of all of the words in the shadow database is built up.

Embodiments of the data surrogation system include various optimizations. One optimization is called delta extraction. In an embodiment, the raw read process compares last-modified dates at each node of the B+ trees. Delta extraction includes algorithms that determine last-modified times of mailboxes, folders, messages, and attachments. If the last-modified time is not different from the previous last-modified time, the read does not proceed lower in the B+ tree. This greatly reduces extraction time after a production database has initially been completely extracted. For example, an initial extraction might take 6 hours, while subsequent extractions (performed every 30 minutes) might take 5-10 minutes. Delta extraction may not handle various situations, such as a user moving an item from one folder to another. Other optimizations perform more detailed examinations of items to detect changes such as moves and deletions. These further optimizations are described below. In an embodiment, the extract process is a two-part process for increased efficiency, but embodiments are not so limited. The first part includes delta extraction, which runs very fast. The second part runs out-of-band and catches changes such as moves and deletions.

Another optimization is called single instancing, or de-duping. Every time a bulk-to-brick extract process is performed, the extract component is looking at a historical view of the production database file, which is constantly changing over time. However, many of the items (messages or attachments, etc.) may have not changed since the last bulk-to-brick process. According to an embodiment, the extract component determines whether the item has already been stored on the utility system during a previous bulk-to-brick process. If so, the item does not need to be stored again, using more storage space. Instead, a pointer to the existing message is stored.

Another optimization is called delta instancing, according to which only changes to an item are saved, rather than an entire changed item. As an example, suppose a message with an attachment is sent from Peter to Roy. Roy makes changes to the attachment and sends it to Rick, who sends the attachment on, perhaps with or without changes, etc. When the extract component operates on the database file it learns there are four instances of the attachment document. In an embodiment, cryptographic checksums of the instances are compared. A checksum associated with an item changes if changes are made to an item. In an embodiment, if single-instancing reveals that there are four different versions of the attachment document, a diff is performed to find the differences. If differences between the original version and a later version are relatively small, the original version is stored and only the differences are stored for the later version.

Another consideration when detecting changes is that all of the changes should be stored efficiently for compliance purposes. Older versions should not be overwritten so that an accurate historical picture can be recreated. In an embodiment, when a message is first extracted, the message and attachment in total is cryptographically hashed, which uniquely identifies it as a string. This checksum or hash is also called the aggregate message checksum. Later, when the message is retrieved for a requesting user, another checksum is generated and compared with the checksum computed at storage time to see whether they match. If they do not match, the requested item has been touched in the meantime.

Returning to the point in the process when the message to be stored is originally hashed, after the aggregate checksum is generated, the message is decomposed into a message header, message body, and 0 or more attachments. All the individual items of the aggregate message are examined to determine whether they have been seen before, including comparing checksums or hashes. The hashes are stored in a table that associates each hash with a storage location of an item. This constitutes a hash table mapping hashes to storage locations. In an embodiment, the hash table is kept as metadata in the metabase, but embodiments are not so limited.

Storing cryptographic hashes for items provides tamper detection because if a user accesses an item at all, the hash will change. In addition, cryptographic hashes facilitate detecting moved items. If a message has been moved from one location to another location, it initially appears as a new item, even though it is not. Embodiments include delta detection regarding which messages have disappeared since the last time and which have appeared since the last time. Embodiments also perform a cryptographic hash to determine if a message is really new. Embodiments also check an item's entry ID, which is a MAPI property. The entry ID does not change, no matter where an item is moved to, or how many times it is moved.

When different messages with attachments are encountered in the extract process, the attachments may be the same. When the messages are decomposed, the checksums of the attachments are checked. Whenever a previously stored attachment is encountered, a pointer is stored that points to the previously stored attachment.

In an embodiment, a reference count for each item is also kept. Each time an attachment is encountered for example, the reference count is incremented. Each time an attachment is deleted (for example because a message was deleted), the reference is count decremented. In an embodiment, the reference count is kept as metadata in the metabase, but embodiments are not so limited.

Figure 16:
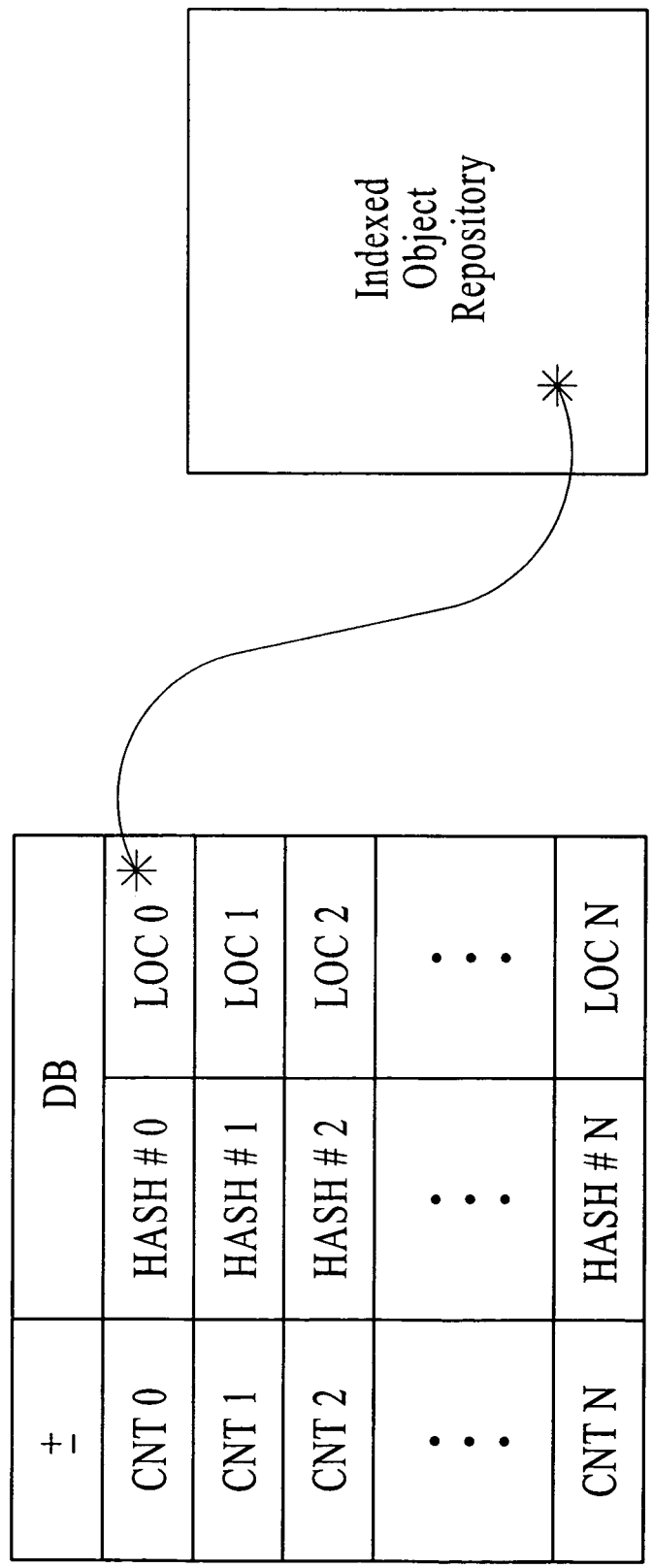
FIG. 16 is a block diagram of a hash table according to an embodiment.

FIG. 16 is a block diagram of a hash table according to an embodiment. The hash table includes a column on the left for reference counts. Reference count 0 (CNT0) refers to item 0, and so on. The reference count is incremented or decremented as previously described. The hash table also includes database (DB) columns on the right for hash numbers and corresponding locations. Each hash number uniquely identifies an item. Each location entry points to a location in the indexed object repository for an associated item.

Figure 17:
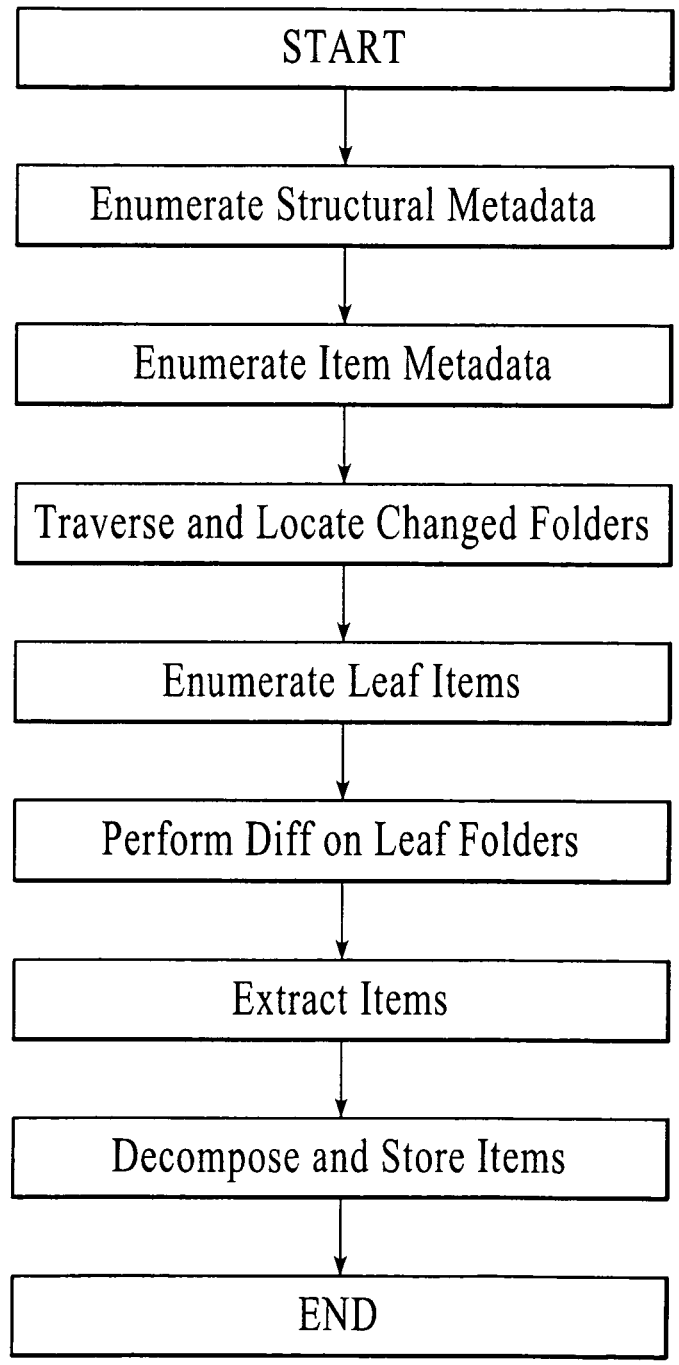
FIG. 17 is a flow diagram illustrating a dynamic extract, or bulk-to-brick process according to an embodiment.

FIG. 17 is a flow diagram illustrating an extract, or bulk-to-brick process according to an embodiment. The bulk-to-brick process starts operating on the shadow database which includes the shadowed database file from the production system which has been kept up-to-date by applying log files on an ongoing basis. In an embodiment, a separate copy of the shadow database is made and the extract component operates on the copy, but embodiments are not so limited.

Structural metadata of the database file is enumerated. In the examples given, an Exchange™ database structure was cited, but embodiments are applicable to any database structure. The structural metadata indicates how the database is arranged, timestamp information, etc. Item metadata is then enumerated. Folders in the database structure are traversed to locate changed folders. This includes checking timestamps. If a folder is not changed, the contents of the folder have not changed, so the process does not go into that folder. Leaf items in/under changed folders are enumerated, and each leaf folder is diffed to determine what changes occurred since the last time the extract process was run. Items are extracted, along with their metadata. The items are decomposed, for example, into message body, message header, attachment, and so on. The decomposed items are stored along with the appropriate information in the hash table previously described. The process is then at an end. But the process is re-run, typically automatically on a regular basis (such as every 30 minutes). This keeps the indexed object repository populated with very current data that is accessible as an archive, a backup, etc. Alternatively, the extract or bulk-to-brick process could be run on demand by an administrator as desired.

Figure 18:
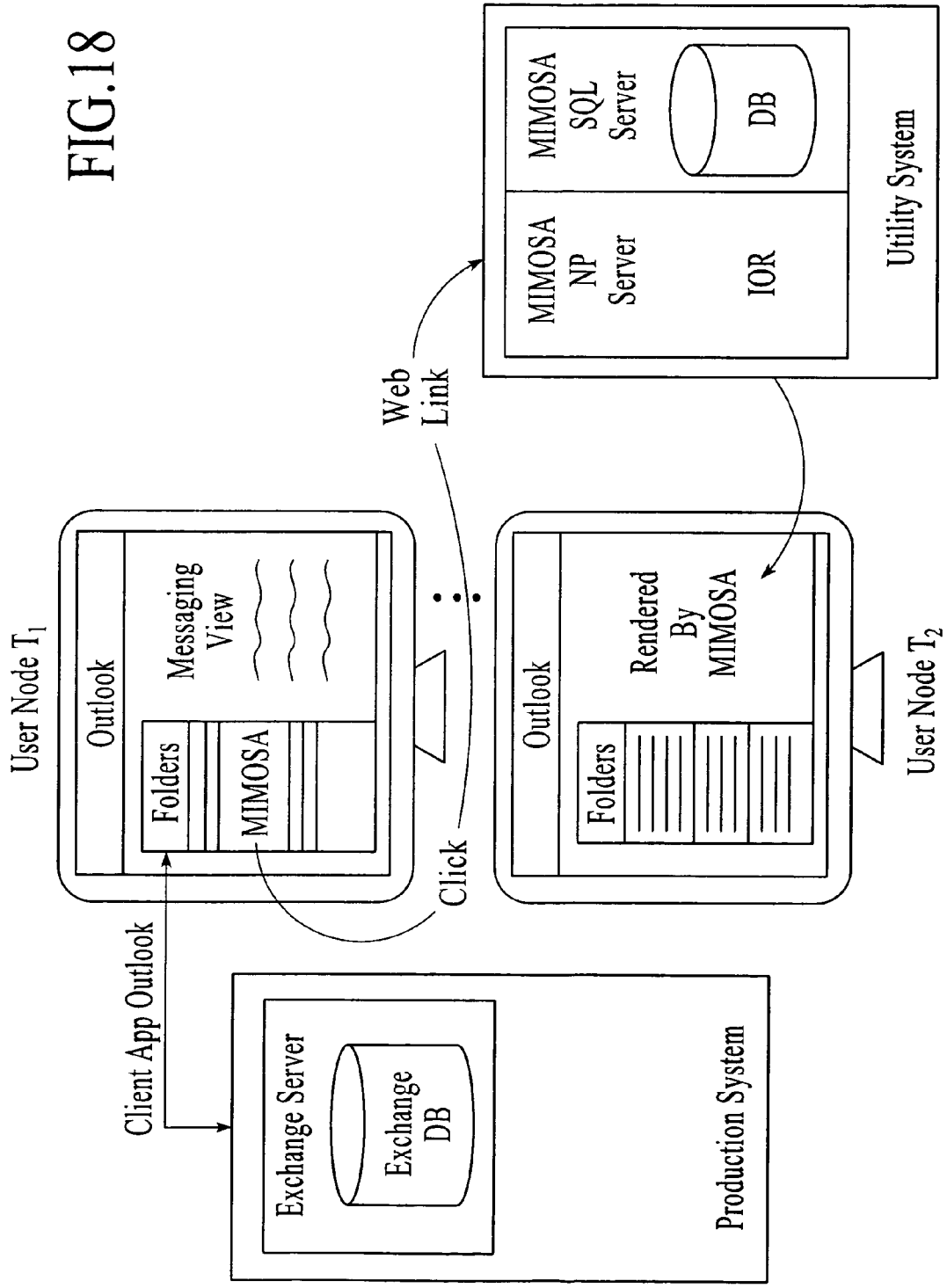
FIG. 18 is a block diagram illustrating self-service access to indexed items according to an embodiment.

FIG. 18 is a block diagram illustrating self-service access to indexed items according to an embodiment. As previously mentioned, the up-to-date archive of items from the production system that is maintained on the indexed item repository of the utility system is readily accessed by many applications. The indexed item repository is essentially a searchable file system containing items in any application format. In addition, a metabase (in an embodiment a SQL server and SQL database) stores complete and accurate metadata that enables exhaustive search, auditing, monitoring and supervision functions. FIG. 18 illustrates an embodiment including self-service as a part of one-pass protection and data management (for example, as illustrated in FIG. 2) provided by Mimosa™ Systems, Inc.

A production system includes a Microsoft Exchange™ server and database. In other embodiments various production servers and databases may be present in place of Exchange™. The Exchange™ server is presenting a logical view to a user at a user node at time T1. The user node is any access device, such as a personal computer (PC). The user sees the logical view of Exchange™ through a client application such as Outlook™. For the logical view, the Exchange™ server has many mailboxes. A user can typically access only the user's own mailbox or mailboxes. The user mailbox has multiple folders, which in turn can include notes, calendar items, messages, task, etc. And folder can also have other folders. The leaf nodes are items, such as messages.

This logical view is in contrast to the "physical" view of the Exchange server, which includes EDBs, STMs, and logs contained within multiple storage groups in a mailbox store. When data is extracted in bulk it is in the physical view, whereas data extracted in brick is in the logical view. As described herein, one-pass protection and data management allows complete archiving in brick form without slow, separate brick extraction. In addition, the brick level, or logical view, archive is readily accessible to any data management applications.

Referring to the user node at time T1, an Outlook™ screen is displayed with a messaging view. A list of folders arranged hierarchically is on the left of the messaging view. A list of message items is on the right of the messaging view. This view is just one example of a view presented by an application. At T1, Outlook™ is talking to Exchange™, probably using MAPI (also possibly POP3 or other messaging protocols). At T1, each time the user clicks on a folder they see a view that is being rendered by Exchange™ using MAPI.

However, there is a special folder in the list on the left, created by Mimosa™ and called the Mimosa™ archive (this could be renamed). When the user clicks on the Mimosa™ folder, a different protocol than MAPI is used. In an embodiment, the folder invokes a web service that is talking to the Mimosa™ utility system. Transparently to the user, there is no communication with Exchange after the Mimosa™ folder is clicked. This technology is referred to as "folder home page".

In an embodiment, the folder home page capability allows the user to access the indexed object repository using the Outlook™ messaging view. Clicking on the Mimosa™ folder invokes a web link that accesses the Mimosa™ utility system, which includes an indexed object repository on a Mimosa NearPoint™ server, and an SQL server and SQL database including metadata, as previously described.

The user node at time T2 (after clicking the Mimosa™ folder) displays what looks like an Outlook™ messaging view, but the right side information is rendered by Mimosa™. For example, the right side of the display could identify information to be entered for a search request. When the user makes a request (whether it is a search request or a browse request) the request is passed to the SQL database for identification of the user's folders, attachments, messages, etc. using the stored metadata. The virtual view of that metadata is presented to the user, so they can see their mailboxes, folders, attachments, and so on. If the user clicks on an attachment and indicates a desire to look at it, the message or attachment is found, reconstituted, and sent back. The user can operate on the returned item in any of the usual ways, such as render a message, forward the message, delete the message, etc.

In one embodiment, clicking on the Mimosa™ folder renders a quick search view. In the quick search view, the user can enter a search term and hit enter. The search term is rendered by the web service (for example as SOAP, XML, HTTP, etc.), and analyzed by Mimosa™ to determine what view should be presented. Mimosa™ performs a database search for the items associated with the search term. The returned search results are then rendered on the right side of the Outlook™ screen.

What the user is looking for may be stored in any one of multiple tiers of storage. For example, according to an information life-cycle management function of an embodiment, items are intelligently stored off-line (for example, stored remotely on tape) due to various factors, including age. Depending on what the item is, or who the reader is, the item may be retrieved quickly or not so quickly. If the user searches for a message that is stored off-line, the metadata, such as the message header, can be quickly returned for viewing, but not the message body. The user may not need to see more than the metadata in many circumstances. However, if the user wants to see the off-line data, the user can select one or more off-line messages and direct them to be retrieved. A process retrieves the requested messages from tape and returns them asynchronously. For example, an hour or so after the request, the user receives a .pst file with all of the requested messages.

FIG. 18 illustrates just on example of the powerful and deep data management capabilities enabled by data surrogation methods and apparatus described herein. Many other uses are possible, and many applications (other than Outlook™, for example) may access the indexed object repository in many other ways. For example, if the user is an auditor, the user may see multiple mailboxes that they are permitted to see. If the user is performing electronic discovery, the user can use a thick client that makes queries and gives the user the resulting data. Typically an auditor performs monitoring and supervision. This includes looking at a message, commenting on it, making notes, then storing the message back in the archive. In this case, additional extra metadata is stored to reflect the auditor's comments. The messages and annotated metadata are always accessible. Later, if someone wanted to perform legal discovery, all of the relevant messages and all of the metadata (e.g., auditors' comments) is exportable, for example as a .pst file.

Multiple layers of data management are made easy using embodiments described herein. For example, more senior auditors may need to document the behavior of lower-level auditors. Lower-level auditors might do simple pattern matching. There may be many lower-level auditors.

The work of the lower-level auditors can be passed to a senior auditor for review. The enterprise may also need to tailor the audit results to verify that the auditors are actually doing their job. For example, an auditor might be expected to look at X messages/day. Being able to prove that this happened is often required for compliance with laws or regulations. Embodiments enable this and many other types of custom auditing, tracking, and reporting. The auditor or user is able to see their own logical view of the data. In an example of a messaging production system, the logical view may be presented by Exchange™, but the data is archived, managed, and accessed by Mimosa™.

Figure 19:
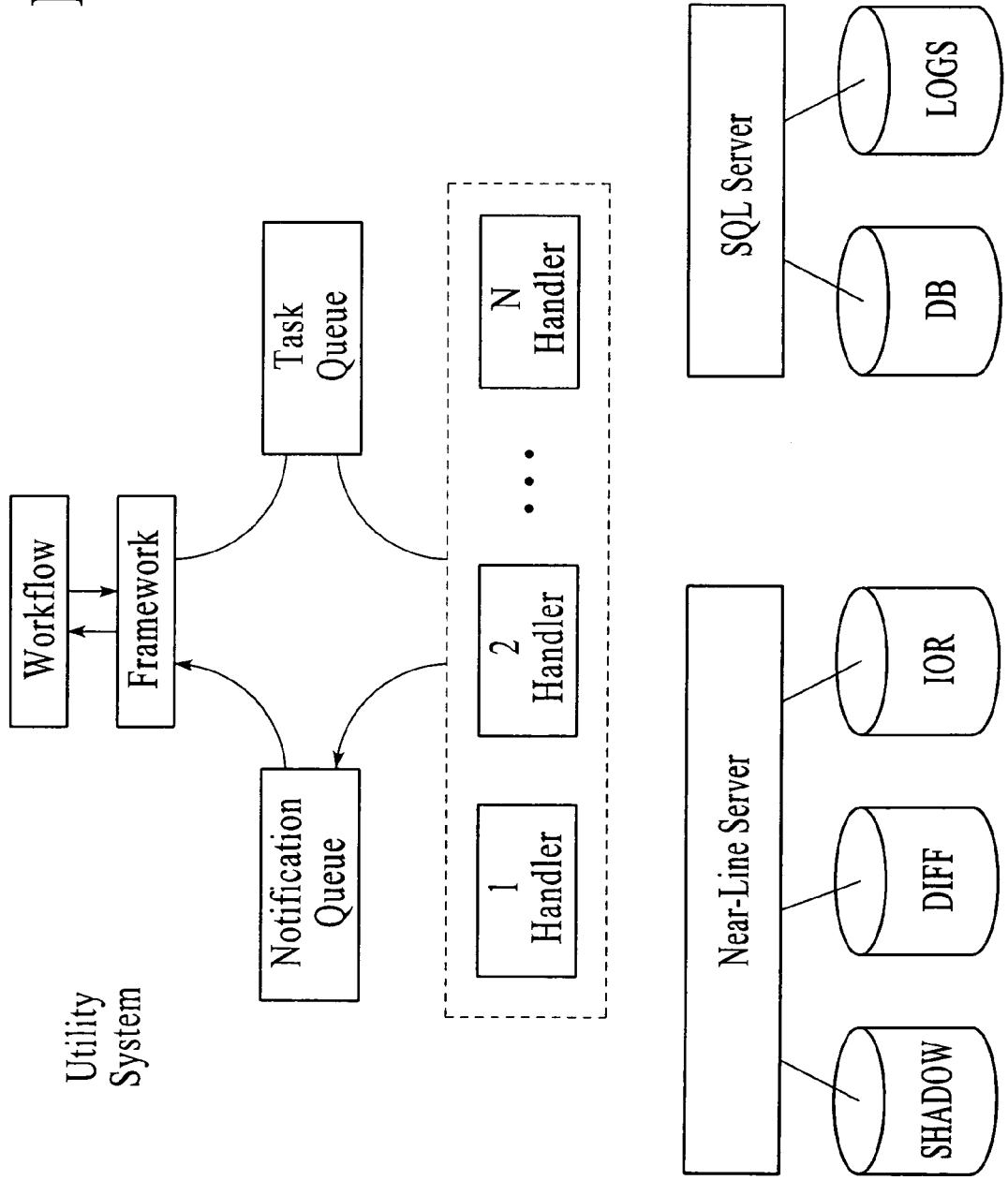
FIG. 19 is a block diagram of a utility system architecture having the data surrogation capabilities described herein, according to an embodiment.

FIG. 19 is a block diagram of a utility system architecture having the data surrogation capabilities described herein, according to an embodiment. The utility system includes one or more near-line servers (one is shown for convenience) which communicate with a shadow database, a diff database, and an indexed object repository (IOR) database. The utility system further includes one or more SQL servers. An SQL server is a relational database management system (RDBMS) produced by Microsoft. Its primary query language is Transact-SQL, an implementation of the ANSI/ISO standard Structured Query Language (SQL). Other RDBMSs can also be used. Also, more than one SQL server may be used. The SQL server uses an SQL database and a log database that stores log files.

The utility system further includes a framework, multiple handlers, and queues (for example, a notification queue and a task queue are shown). The utility system further includes a workflow. In an embodiment, the utility system receives a request. Examples of a request include a timer being activated, or a user or administrator making a request. The request manifests itself as a notification, which is placed in the notification queue. The framework grabs the notification from the notification queue and looks it up in the workflow to determine how to handle the particular notification. The framework looks up the workflow and then calls the appropriate handler depending on what it learned from the workflow. The framework places the notification in the task queue. The handler takes the notification from the task queue and proceeds to handle it as appropriate.

The framework determines whether the request has been successfully handled, and determines what to do next. The framework looks to the workflow to get the next notification and call the next handler, and the process continues. This architecture allows "hot code load". For example, in an embodiment, the utility system software code, including the code related to the data surrogation capabilities described herein, is written in the form of handlers. This is advantageous, especially in the situation of a system in the field, because the system can be easily updated by simply installing one or more new handlers. If there are any issues with a new handler, the new handler can be discarded in favor of the handler it was meant to replace.

Many variations of the multi-dimensional surrogation including bulk-to-brick transformation of structured, semi-structured and unstructured data are contemplated to be within the scope of the claimed invention. In various embodiments, the bulk-to-brick transformation is dynamic, in contrast to occurring according to a pre-defined schedule.

In various embodiments, different production systems with production servers and databases other than those explicitly described are operated on by the bulk-to-brick transformation described herein. For example, any structured, semi-structured and unstructured data may be operated on as described herein.

Although messaging servers and databases that enable email are used to illustrate embodiments herein, the embodiments described are equally application to instant messaging (IM) messages, voiceover internet protocol (VoIP) messages, and other forms of data. In some cases, voice mail messages are already stored as email attachments in Exchange, allowing the voice mail messages to be operated on as item data as described herein. Embodiments of the invention are further applicable to many other forms of data and system architectures not explicitly described herein.

In various embodiments, the availability of the indexed object repository to data management applications may be to the actual data that is being modified by the process, or it may be to a copy of that data, or it may be some combination thereof. This may be available in the form of an API or web service or equivalent.

The components of the multi-dimensional surrogation described above may include any collection of computing components and devices operating together. The components of the multi-dimensional surrogation can also be components or subsystems within a larger computer system or network. Components of the multi-dimensional surrogation can also be coupled among any number of components (not shown), for example other buses, controllers, memory devices, and data input/output (I/O) devices, in any number of combinations. Further, functions of the multi-dimensional surrogation can be distributed among any number/combination of other processor-based components.

The information management of an embodiment includes a method comprising determining a first structure of data. The first structure of an embodiment is a proprietary structure. The method of an embodiment includes parsing items of the data using information of the first structure. The method of an embodiment includes dynamically transforming the data by organizing the items into a second structure that preserves the hierarchy of the first structure.

The method of an embodiment includes providing access to at least a portion of the items in the second structure via a plurality of applications.

Providing access of an embodiment includes providing access using a second protocol that is different from a first protocol used to access the data of the first structure.

The method of an embodiment includes using a second protocol to access the second structure and using a first protocol to access the first structure. The first protocol of an embodiment is different than the second protocol.

The first protocol of an embodiment includes one or more of Messaging Application Programming Interface (MAPI) protocol, Post Office Protocol (POP), and Internet Message Access Protocol (IMAP).

The second structure of an embodiment is stored on a second server. An original version of the data of an embodiment is stored on a first server.

The parsing of an embodiment is performed at predetermined intervals.

The parsing of an embodiment is performed according to changes in state of the data.

The parsing of an embodiment is performed according to availability of the data.

The parsing of an embodiment includes parallel parsing of a plurality of the items.

The parsing of an embodiment includes systematically reading information of the data. The information of an embodiment includes one or more of tables and the items.

The tables of an embodiment include one or more of a mailbox table, a folder table, a message table, and an attachment table.

The items of an embodiment include one or more of a folder, a mailbox, an electronic mail body, an electronic mail header, and an electronic mail attachment.

The method of an embodiment includes generating a shadow copy of the data on a second server. An original version of the data of an embodiment is stored on a first server.

The parsing of an embodiment includes parsing items of the shadow copy.

The method of an embodiment includes decompressing one or more of the items.

The organizing of an embodiment includes transferring a first portion of information of the items into a first file and transferring a second portion of information of the items into a second file.

The organizing of an embodiment includes indexing the items into the second structure.

The organizing of an embodiment includes traversing the first structure and locating information of the items.

The information of the items of an embodiment includes one or more of type and content of the items.

The indexing of an embodiment includes generating indices corresponding to the items. The indexing of an embodiment includes associating the items with the indices using the information of the items.

The method of an embodiment includes comparing modification information of each item with modification information of a previous instance of the item. The method of an embodiment includes ceasing the traversing at a current node of the first structure when the modification information shows the item is unmodified since the previous instance.

The modification information of an embodiment includes one or more of modification date and modification time.

The method of an embodiment includes determining whether an item is a previously-encountered item that has previously been stored in the second structure. The method of an embodiment includes generating a pointer to the previously-encountered item.

The method of an embodiment includes comparing modification information of each item with modification information of a previous instance of the item. The method of an embodiment includes indexing difference information of the item when the modification information shows the item is modified since the previous instance.

The difference information of an embodiment includes information of changes between a current version and at least one previously-modified version of the item.

The organizing of an embodiment comprises hashing information of each instance of the item by generating a checksum.

The method of an embodiment includes determining if the item has been altered since the organizing by comparing checksums of different instances of the item in the second structure. The determining of an embodiment is performed in response to a request to retrieve the item from the second structure.

The method of an embodiment includes transferring the checksum to a hash table.

The method of an embodiment includes decomposing the item into at least one component.

The item of an embodiment is an electronic mail message, wherein the at least one component includes one or more of a message header, a message body, and a message attachment.

The indexing of an embodiment includes transferring the items into an indexed object repository.

The indexing of an embodiment includes transferring metadata of the items into a metadata repository.

The method of an embodiment includes receiving a plurality of delta data at a second server. The delta data of an embodiment describes incremental changes to the data of a first server. The method of an embodiment includes generating an updated version of the data at the second server. Generating the updated version of an embodiment includes applying the delta data to a copy of the data on the second server. The method of an embodiment includes controlling the applying using modified information of a component of the second server.

The component of an embodiment includes structural metadata of the copy of the data.

The component of an embodiment includes a log file of the delta data.

The method of an embodiment includes modifying the component.

The component of an embodiment is structural metadata of the copy.

The modifying of an embodiment comprises detecting a first state of the copy. The first state of an embodiment indicates the delta data has been applied to the copy.

The modifying of an embodiment comprises changing the first state to a second state. The second state of an embodiment is a state from which another updated version can be generated by applying additional delta data to the updated version.

Changing the first state to the second state of an embodiment includes modifying the structural metadata of the copy.

The additional log file of an embodiment is received after generating the updated version.

The method of an embodiment includes updating structural metadata of the copy to reference a first unapplied delta data. The first unapplied delta data of an embodiment is a first log file unapplied to the copy.

The applying of an embodiment includes invoking an engine of the first server.

The component of an embodiment is a log file of the delta data.

The applying of an embodiment includes invoking an engine of the first server and the terminating includes stalling the engine.

The method of an embodiment includes receiving at the second server a copy of the data from the first server.

The copy of an embodiment is one or more of a full copy and an incremental copy.

The method of an embodiment includes transferring the updated version to an indexed object repository.

The generating of an embodiment is in response to at least one of an automatic trigger, a timer notification, an event notification, a poll, and a request.

The automatic trigger of an embodiment includes a trigger automatically initiated in response to at least one pre-specified parameter.

The automatic trigger of an embodiment includes content of the updated version.

The timer notification of an embodiment includes notifications corresponding to scheduled events including at least one of maintenance operations, user activities, server activities, and data population operations.

The event notification of an embodiment includes notifications corresponding to changes to the items of the data.

The request of an embodiment includes at least one of access attempts and configuration attempts to the data by one or more of the users, servers and applications.

The second server of an embodiment includes a near-line server.

The generating of an embodiment is in near real-time and maintains complete integrity and consistency of the data.

The method of an embodiment includes maintaining the updated version. The maintaining of an embodiment includes generating another updated version by applying at least one set of log files to the updated version. The at least one set of log files of an embodiment are received later in time than the plurality of log files.

The first server of an embodiment includes one or more of local servers, remote servers, data servers, messaging servers, electronic mail servers, instant messaging servers, voice-over Internet Protocol servers, collaboration servers, messaging and collaboration servers, Exchange servers, portals, customer relationship management (CRM) servers, enterprise resource planning (ERP) servers, business-to-business servers, and content management servers.

The data of an embodiment is Exchange data and the first structure of an embodiment is a B+ tree structure.

The second structure of an embodiment is a composite data container.

The hierarchy of an embodiment is preserved using metadata.

The hierarchy of an embodiment is preserved using a file structure.

The information management of an embodiment includes a method comprising determining a first structure of data. The method of an embodiment includes dynamically transforming the data into a second structure that preserves the hierarchy of the first structure. The method of an embodiment includes providing access to the data of the second structure by a plurality of applications via a second protocol different from a first protocol used to access the data of the first structure.

The dynamically transforming of an embodiment includes parsing items of the data and organizing the items into the second structure.

The parsing of an embodiment is performed according to one or more of predetermined intervals, changes in state of the data, and availability of the data.

The parsing of an embodiment includes systematically reading information of the data, the information including one or more of tables and the items.

The tables of an embodiment include one or more of a mailbox table, a folder table, a message table, and an attachment table, wherein the items include one or more of a folder, a mailbox, an electronic mail body, an electronic mail header, and an electronic mail attachment.

The second structure of an embodiment is stored on a near-line server. An original version of the data of an embodiment is stored on a first server.

The method of an embodiment includes generating a shadow copy of the data on a near-line server. An original version of the data of an embodiment is stored on a first server.

The transforming of an embodiment includes organizing items of the data into the second structure.

The organizing of an embodiment includes transferring a first portion of information of the items into a first file and transferring a second portion of information of the items into a second file.

The organizing of an embodiment includes indexing the items into the second structure.

The organizing of an embodiment includes traversing the first structure and locating information of the items.

The method of an embodiment includes decomposing each item of the items into at least one component.

The item of an embodiment is an electronic mail message. The at least one component of an embodiment includes one or more of a message header, a message body, and a message attachment.

The information management of an embodiment includes a computer readable medium including executable instructions which, when executed in a processing system, support bulk-to-brick extraction of data by determining a first structure of data, wherein the first structure is a proprietary structure. The instructions of an embodiment when executed parse items of the data using information of the first structure. The instructions of an embodiment when executed dynamically transform the data by organizing the items into a second structure that preserves the hierarchy of the first structure.

The information management of an embodiment includes a system comprising a near-line server coupled to a first server that includes original data. The system of an embodiment includes a transformation system coupled to the near-line server and configured to determine a first structure of data. The first structure of an embodiment is a proprietary structure. The transformation system of an embodiment is configured to parse items of the data using information of the first structure. The transformation system of an embodiment is configured to dynamically transform the data by organizing the items into a second structure that preserves the hierarchy of the first structure.

The system of an embodiment is configured to provide access to at least a portion of the items in the second structure via a plurality of applications.

Providing access of an embodiment includes providing access using a second protocol that is different from a first protocol used to access the data of the first structure.

The system of an embodiment is configured to allow a second protocol to access the second structure. A first protocol of an embodiment is used to access the first structure. The first protocol of an embodiment is different than the second protocol.

The first protocol of an embodiment includes one or more of Messaging Application Programming Interface (MAPI) protocol, Post Office Protocol (POP), and Internet Message Access Protocol (IMAP).

The second structure of an embodiment is stored on the near-line server. An original version of the data of an embodiment is stored on a first server.

The system of an embodiment is configured to parse at predetermined intervals.

The system of an embodiment is configured to parse according to changes in state of the data.

The system of an embodiment is configured to parse according to availability of the data.

The system of an embodiment is configured to simultaneously parse a plurality of the items.

The system of an embodiment is configured to parse by systematically reading information of the data, the information including one or more of tables and the items.

The tables of an embodiment include one or more of a mailbox table, a folder table, a message table, and an attachment table.

The items of an embodiment include one or more of a folder, a mailbox, an electronic mail body, an electronic mail header, and an electronic mail attachment.

The system of an embodiment is configured to generate a shadow copy of the data on the near-line server. An original version of the data of an embodiment is stored on a first server.

The parsing of an embodiment includes parsing items of the shadow copy.

The system of an embodiment is configured to decompress one or more of the items.

The system of an embodiment is configured to organize by transferring a first portion of information of the items into a first file and transferring a second portion of information of the items into a second file.

The system of an embodiment is configured to organize by indexing the items into the second structure.

The system of an embodiment is configured to organize by traversing the first structure and locating information of the items.

The information of the items of an embodiment includes one or more of type and content of the items.

The system of an embodiment is configured to index by generating indices corresponding to the items. The transformation system of an embodiment is configured to index by associating the items with the indices using the information of the items.

The system of an embodiment is configured to compare modification information of each item with modification information of a previous instance of the item. The system of an embodiment is configured to cease the traversing at a current node of the first structure when the modification information shows the item is unmodified since the previous instance.

The modification information of an embodiment includes one or more of modification date and modification time.

The system of an embodiment is configured to determine whether an item is a previously-encountered item that has previously been stored in the second structure. The system of an embodiment is configured to generate a pointer to the previously-encountered item.

The system of an embodiment is configured to compare modification information of each item with modification information of a previous instance of the item. The system of an embodiment is configured to index difference information of the item when the modification information shows the item is modified since the previous instance.

The difference information of an embodiment includes information of changes between a current version and at least one previously-modified version of the item.

The system of an embodiment is configured to organize by hashing information of each instance of the item by generating a checksum.

The system of an embodiment is configured to determine if the item has been altered since the organizing by comparing checksums of different instances of the item in the second structure. The determining of an embodiment is performed in response to a request to retrieve the item from the second structure.

The system of an embodiment is configured to transfer the checksum to a hash table.

The system of an embodiment is configured to decompose the item into at least one component.

The item of an embodiment is an electronic mail message. The at least one component of an embodiment includes one or more of a message header, a message body, and a message attachment.

The system of an embodiment is configured to index by transferring the items into an indexed object repository.

The system of an embodiment is configured to index by transferring metadata of the items into a metadata repository.

The system of an embodiment is configured to receive a plurality of delta data at the near-line server, wherein the delta data describes incremental changes to the data of a first server. The system of an embodiment is configured to generate an updated version of the data at the near-line server. Generating the updated version of an embodiment includes applying the delta data to a copy of the data on the near-line server. The system of an embodiment is configured to controlling the applying using modified information of a component of the near-line server.

The component of an embodiment includes structural metadata of the copy of the data.

The component of an embodiment includes a log file of the delta data.

The system of an embodiment is configured to modify the component. The component of an embodiment is structural metadata of the copy.

The system of an embodiment is configured to modify by detecting a first state of the copy. The first state of an embodiment indicates the delta data has been applied to the copy.

The system of an embodiment is configured to modify by changing the first state to a second state. The second state of an embodiment is a state from which another updated version can be generated by applying additional delta data to the updated version.

Changing the first state to the second state of an embodiment includes modifying the structural metadata of the copy.

The additional log file of an embodiment is received after generating the updated version.

The system of an embodiment is configured to update structural metadata of the copy to reference a first unapplied delta data. The first unapplied delta data of an embodiment is a first log file unapplied to the copy.

The system of an embodiment is configured to apply by invoking an engine of the first server.

The component of an embodiment is a log file of the delta data.

The system of an embodiment is configured to apply by invoking an engine of the first server and the terminating includes stalling the engine.

The system of an embodiment is configured to receive at the near-line server a copy of the data from the first server.

The copy of an embodiment is one or more of a full copy and an incremental copy.

The system of an embodiment is configured to transfer the updated version to an indexed object repository.

The system of an embodiment is configured to generate in response to at least one of an automatic trigger, a timer notification, an event notification, a poll, and a request.

The automatic trigger of an embodiment includes a trigger automatically initiated in response to at least one pre-specified parameter.

The automatic trigger of an embodiment includes content of the updated version.

The timer notification of an embodiment includes notifications corresponding to scheduled events including at least one of maintenance operations, user activities, server activities, and data population operations.

The event notification of an embodiment includes notifications corresponding to changes to the items of the data.

The request of an embodiment includes at least one of access attempts and configuration attempts to the data by one or more of the users, servers and applications.

The system of an embodiment is configured to generate in near real-time and maintain complete integrity and consistency of the data.

The system of an embodiment is configured to maintain the updated version by generating another updated version by applying at least one set of log files to the updated version, the at least one set of log files received later in time than the plurality of log files.

The first server of an embodiment includes one or more of local servers, remote servers, data servers, messaging servers, electronic mail servers, instant messaging servers, voice-over Internet Protocol servers, collaboration servers, messaging and collaboration servers, Exchange servers, portals, customer relationship management (CRM) servers, enterprise resource planning (ERP) servers, business-to-business servers, and content management servers.

The data of an embodiment is Exchange data and the first structure of an embodiment is a B+ tree structure.

The second structure of an embodiment is a composite data container.

The hierarchy of an embodiment is preserved using metadata.

The hierarchy of an embodiment is preserved using a file structure.

The information management of an embodiment includes a system comprising a near-line server coupled to a first server that includes original data. The system of an embodiment includes a transformation system coupled to the near-line server and configured to determine a first structure of data. The transformation system of an embodiment is configured to dynamically transform the data into a second structure that preserves the hierarchy of the first structure. The transformation system of an embodiment is configured to provide access to the data of the second structure by a plurality of applications via a second protocol different from a first protocol used to access the data of the first structure.

The system of an embodiment is configured to dynamically transform by parsing items of the data and organizing the items into the second structure.

The system of an embodiment is configured to parse according to one or more of predetermined intervals, changes in state of the data, and availability of the data.

The system of an embodiment is configured to parse by systematically reading information of the data, the information including one or more of tables and the items.

The tables of an embodiment include one or more of a mailbox table, a folder table, a message table, and an attachment table, wherein the items include one or more of a folder, a mailbox, an electronic mail body, an electronic mail header, and an electronic mail attachment.

The second structure of an embodiment is stored on the near-line server. An original version of the data of an embodiment is stored on the first server.

The system of an embodiment is configured to generate a shadow copy of the data on the near-line server. An original version of the data of an embodiment is stored on the first server.

The system of an embodiment is configured to transform by organizing items of the data into the second structure.

The system of an embodiment is configured to organize by transferring a first portion of information of the items into a first file and transferring a second portion of information of the items into a second file.

The system of an embodiment is configured to organize by indexing the items into the second structure.

The system of an embodiment is configured to organize by traversing the first structure and locating information of the items.

The system of an embodiment is configured to decompose each item of the items into at least one component.

The item of an embodiment is an electronic mail message. The at least one component of an embodiment includes one or more of a message header, a message body, and a message attachment.

The information management of an embodiment includes a device comprising a transformation system coupled to a near-line server. The transformation system of an embodiment is configured to determine a first structure of data. The data of an embodiment is stored on a first server coupled to the near-line server. The transformation system of an embodiment is configured to dynamically transform the data into a second structure that preserves the hierarchy of the first structure. The transformation system of an embodiment is configured to provide access to the data of the second structure by a plurality of applications via a second protocol different from a first protocol used to access the data of the first structure.

Aspects of the multi-dimensional surrogation described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the multi-dimensional surrogation include: microcontrollers with memory (such as electronically erasable programmable read only memory (EEPROM)), embedded microprocessors, firmware, software, etc. Furthermore, aspects of the multi-dimensional surrogation may be embodied in microprocessors having software-based circuit emulation, discrete logic (sequential and combinatorial), custom devices, fuzzy (neural) logic, quantum devices, and hybrids of any of the above device types. Any underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components of multi-dimensional surrogation disclosed herein may be described using data and/or instructions embodied in various computer-readable media. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the multi-dimensional surrogation may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the multi-dimensional surrogation is not intended to be exhaustive or to limit the multi-dimensional surrogation to the precise form disclosed. While specific embodiments of, and examples for, the multi-dimensional surrogation are described herein for illustrative purposes, various equivalent modifications are possible within the scope of the multi-dimensional surrogation, as those skilled in the relevant art will recognize. The teachings of the multi-dimensional surrogation provided herein can be applied to other processing systems and methods, not only for the systems and methods described above.

The elements and acts of the various embodiments described above can be combined to provide further embodiments. These and other changes can be made to the multi-dimensional surrogation and methods in light of the above detailed description.

In general, in the following claims, the terms used should not be construed to limit the multi-dimensional surrogation and methods to the specific embodiments disclosed in the specification and the claims, but should be construed to include all processing systems that operate under the claims. Accordingly, the multi-dimensional surrogation is not limited by the disclosure, but instead the scope of the multi-dimensional surrogation is to be determined entirely by the claims.

While certain aspects of the multi-dimensional surrogation are presented below in certain claim forms, the inventors contemplate the various aspects of the multi-dimensional surrogation in any number of claim forms. For example, while only one aspect of the multi-dimensional surrogation is recited as embodied in machine-readable media, other aspects may likewise be embodied in machine-readable media. Accordingly, the inventors reserve the right to add additional claims after filing the application to pursue such additional claim forms for other aspects of the multi-dimensional surrogation.

What is claimed is:

1. A data management system comprising:
a utility system including at least one processor and configured to communicate with a first server that stores original data, wherein the utility system is configured to receive a plurality of delta data, wherein each delta data describes at least one of an incremental and differential change to the original data of the first server, the utility system configured to apply the plurality of delta data to a copy of the original data stored at the utility system,
a transformation system including at least one processor and coupled to the utility system and configured to:
determine a first structure of the copy of the original data, wherein the first structure is a B+ tree structure,
parse items of the copy of the original data using information of the first structure, wherein the parsing decomposes the items, and
dynamically transform the copy of the original data by organizing the items into a second, different structure that preserves a hierarchy of the first structure, wherein the items according to the second structure are accessible to an application, and wherein the second structure is a directory structure, and
wherein the utility system is configured to provide access to at least a portion of the items in the second structure using a second protocol that is different from a first protocol used to access the copy of the original data of the first structure.

2. The data management system of claim 1, wherein the first protocol includes one or more of a Messaging Application Programming Interface (MAPI) protocol, a Post Office Protocol (POP), and an Internet Message Access Protocol (IMAP).

3. The data management system of claim 1, wherein the second structure is stored on the utility system.

4. The data management system of claim 1, wherein the transformation system is configured to parse at predetermined intervals.

5. The data management system of claim 1, wherein the transformation system is configured to parse according to availability of the copy of the original data.

6. The data management system of claim 1, wherein the transformation system is configured to simultaneously parse a plurality of the items.

7. The data management system of claim 1, wherein the transformation system is configured to parse by systematically reading information of the copy of the original data, the information including one or more of tables and the items.

8. The data management system of claim 7, wherein the tables include one or more of a mailbox table, a folder table, a message table, and an attachment table.

9. The data management system of claim 7, wherein the items include one or more of a folder, a mailbox, an electronic mail body, an electronic mail header, and an electronic mail attachment.

10. The data management system of claim 1, wherein the transformation system is configured to decompress one or more of the items.

11. The data management system of claim 1, wherein the transformation system is configured to perform the organizing by transferring a first portion of information of the items into a first file and transferring a second portion of information of the items into a second file.

12. The data management system of claim 1, wherein the transformation system is configured to perform the organizing by indexing the items into the second structure.

13. The data management system of claim 12, wherein the transformation system is configured to perform the organizing by traversing the first structure and locating information of the items.

14. The data management system of claim 13, wherein the information of the items includes one or more of type and content of the items.

15. The data management system of claim 13, wherein the transformation system is configured to index by:
generating indices corresponding to the items; and
associating the items with the indices using the information of the items.

16. The data management system of claim 13, wherein the transformation system is configured to:
compare modification information of each item with modification information of a previous instance of the item; and
cease the traversing at a current node of the first structure when the modification information shows the item is unmodified since the previous instance.

17. The data management system of claim 16, wherein the modification information includes one or more of modification date and modification time.

18. The data management system of claim 13, wherein the transformation system is configured to:
determine whether an item is a previously-encountered item that has previously been stored in the second structure;
generate a pointer to the previously-encountered item.

19. The data management system of claim 13, wherein the transformation system is configured to:
compare modification information of a given item with modification information of a previous instance of the given item; and
index difference information of the given item when the modification information shows the given item is modified since the previous instance.

20. The data management system of claim 19, wherein the difference information includes information of changes between a current version and at least one previously-modified version of the given item.

21. The data management system of claim 13, wherein the transformation system is configured to perform the organizing by hashing information of each instance of a given item by generating a checksum.

22. The data management system of claim 21, wherein the transformation system is configured to determine if the given item has been altered since the organizing by comparing checksums of different instances of the given item in the second structure, the determining performed in response to a request to retrieve the given item from the second structure.

23. The data management system of claim 21, wherein the transformation system is configured to transfer the checksum to a hash table.

24. The data management system of claim 13, wherein the transformation system is configured to decompose a given item into at least one component.

25. The data management system of claim 24, wherein the given item is an electronic mail message, wherein the at least one component includes one or more of a message header, a message body, and a message attachment.

26. The data management system of claim 12, wherein the transformation system is configured to index by transferring the items into an indexed object repository.

27. The data management system of claim 12, wherein the transformation system is configured to index by transferring metadata of the items into a metadata repository.

28. The data management system of claim 1, configured to:
generate an updated version of the copy of the original data at the utility system by applying the delta data; and
controlling the applying using modified information of a component of the utility system.

29. The data management system of claim 28, wherein the component includes structural metadata of the copy of the original data.

30. The data management system of claim 28, wherein the component includes a log file of the delta data.

31. The data management system of claim 28, configured to modify the component.

32. The data management system of claim 31, wherein the component is structural metadata of the copy.

33. The data management system of claim 31, configured to modify by detecting a first state of the copy, wherein the first state indicates the delta data has been applied to the copy.

34. The data management system of claim 33, configured to modify by changing the first state to a second state, wherein the second state is a state from which another updated version can be generated by applying additional delta data to the updated version.

35. The data management system of claim 34, wherein changing the first state to the second state includes modifying structural metadata of the copy.

36. The data management system of claim 33, wherein an additional log file is received after generating the updated version.

37. The data management system of claim 28, configured to update structural metadata of the copy to reference a first unapplied delta data, wherein the first unapplied delta data is a first log file unapplied to the copy.

38. The data management system of claim 31, wherein the component is a log file of the delta data.

39. The data management system of claim 28, configured to receive at the utility system the copy of the original data from the first server.

40. The data management system of claim 39, wherein the copy is one or more of a full copy and an incremental copy.

41. The data management system of claim 28, configured to transfer the updated version to an indexed object repository.

42. The data management system of claim 28, configured to perform the generating in response to at least one of an automatic trigger, a timer notification, an event notification, a poll, and a request.

43. The data management system of claim 42, wherein the automatic trigger includes a trigger automatically initiated in response to at least one pre-specified parameter.

44. The data management system of claim 43, wherein the automatic trigger includes content of the updated version.

45. The data management system of claim 42, wherein the timer notification includes notifications corresponding to scheduled events including at least one of maintenance operations, user activities, server activities, and data population operations.

46. The data management system of claim 42, wherein the event notification includes notifications corresponding to changes to the items of the data.

47. The data management system of claim 42, wherein the request includes at least one of access attempts and configuration attempts to the data by one or more of the users, servers and applications.

48. The data management system of claim 28, configured to perform the generating in near real-time and maintain complete integrity and consistency of the copy of the original data.

49. The data management system of claim 28, configured to maintain the updated version by generating another updated version by applying at least one set of log files to the updated version.

50. The data management system of claim 1, wherein the first server includes one or more of local servers, remote servers, data servers, messaging servers, electronic mail servers, instant messaging servers, voice-over Internet Protocol servers, collaboration servers, messaging and collaboration servers, Exchange servers, portals, customer relationship management (CRM) servers, enterprise resource planning (ERP) servers, business-to-business servers, and content management servers.

51. The data management system of claim 1, wherein the hierarchy is preserved using metadata.

52. The data management system of claim 1, wherein the hierarchy is preserved using a file structure.

53. A method comprising:
   receiving, by a utility system including at least one processor and coupled to a first server that stores original data, a plurality of delta data, where each delta data describes at least one of an incremental and differential change to the original data of the first server;
   applying, by the utility system, the plurality of delta data to a copy of the original data stored at the utility system;
   determining, by a transformation system including at least one processor, a first structure of the copy of the original data, wherein the first structure is a B+ tree structure;
   parsing, by the transformation system, items of the copy of the original data using information of the first structure, wherein the parsing decomposes the items;
   dynamically transforming, by the transformation system, the copy of the original data by organizing the items into a second, different structure that preserves a hierarchy of the first structure, wherein the items according to the second structure are accessible to an application, and wherein the second structure is a directory structure; and
   providing, by the utility system, access to at least a portion of the items in the second structure using a second protocol that is different from a first protocol used to access the copy of the original data of the first structure.

* * * * *